(12) United States Patent
Ye

(10) Patent No.: US 12,171,191 B2
(45) Date of Patent: Dec. 24, 2024

(54) COMMUNICATION SYSTEMS AND METHODS FOR ANIMALS

(71) Applicant: Mingxiao Ye, Jersey City, NJ (US)

(72) Inventor: Mingxiao Ye, Jersey City, NJ (US)

(*) Notice: Subject to any disclaimer, the term of this patent is extended or adjusted under 35 U.S.C. 154(b) by 409 days.

(21) Appl. No.: 17/828,292

(22) Filed: May 31, 2022

(65) Prior Publication Data

US 2022/0378017 A1    Dec. 1, 2022

Related U.S. Application Data

(60) Provisional application No. 63/195,032, filed on May 30, 2021.

(51) Int. Cl.
| | |
|---|---|
| *A01K 15/02* | (2006.01) |
| *A01K 29/00* | (2006.01) |
| *G06F 3/04817* | (2022.01) |
| *G06F 3/0482* | (2013.01) |
| *G06F 3/04842* | (2022.01) |
| *G06F 3/0488* | (2022.01) |
| *G06F 3/16* | (2006.01) |

(52) U.S. Cl.
CPC .......... *A01K 15/021* (2013.01); *A01K 29/005* (2013.01); *G06F 3/04817* (2013.01); *G06F 3/0482* (2013.01); *G06F 3/04842* (2013.01); *G06F 3/0488* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 8,692,676 | B2* | 4/2014 | Touchton | A01K 27/009 |
| | | | | 340/573.3 |
| 8,704,668 | B1* | 4/2014 | Darrell | A01K 29/005 |
| | | | | 340/573.3 |
| 10,918,087 | B2* | 2/2021 | Respass | A01K 27/009 |
| 11,033,002 | B1* | 6/2021 | Mundell | G06V 40/10 |
| 12,048,294 | B2* | 7/2024 | Baron | A01K 5/02 |
| 2004/0083106 | A1* | 4/2004 | Rines | G10L 15/24 |
| | | | | 704/E15.041 |
| 2006/0011144 | A1* | 1/2006 | Kates | G01S 15/86 |
| | | | | 119/859 |
| 2008/0282988 | A1* | 11/2008 | Bloksberg | A01K 15/021 |
| | | | | 119/51.02 |
| 2009/0051548 | A1* | 2/2009 | Dundon | A01K 1/035 |
| | | | | 340/573.3 |
| 2010/0275851 | A1* | 11/2010 | Yin | A01K 5/02 |
| | | | | 119/51.02 |
| 2012/0240863 | A1* | 9/2012 | Araujo | A01K 5/02 |
| | | | | 119/51.01 |
| 2012/0312247 | A1* | 12/2012 | Ebersole | A01K 15/02 |
| | | | | 340/573.3 |
| 2014/0020635 | A1* | 1/2014 | Sayers | A01K 15/021 |
| | | | | 348/143 |

(Continued)

*Primary Examiner* — Muhammad Adnan

(57) ABSTRACT

Systems and methods for facilitating communication with animals. Interacting with a display that presents touchable buttons in manners that are suitable for animals, animals can be trained to use touch gestures to produce speech. Various embodiments add to convenience and ease for designated animal users, offer guidance and flexibility for human users who train or communicate with the animal users, and provide a rich potential for customization and improvements.

14 Claims, 19 Drawing Sheets

(56) References Cited

U.S. PATENT DOCUMENTS

| | | | |
|---|---|---|---|
| 2016/0242393 A1* | 8/2016 | Kennedy | A01K 27/006 |
| 2017/0000081 A1* | 1/2017 | Betts-Lacroix | A61B 5/7264 |
| 2017/0000906 A1* | 1/2017 | Betts-Lacroix | A01K 1/031 |
| 2017/0079242 A1* | 3/2017 | Mosley | G06F 3/165 |
| 2018/0132453 A1* | 5/2018 | Foster | A01K 15/021 |
| 2018/0303064 A1* | 10/2018 | Nowling | E05F 15/77 |
| 2021/0176970 A1* | 6/2021 | Engstrom | G05B 13/0265 |
| 2021/0251191 A1* | 8/2021 | Lee | A01K 15/02 |
| 2022/0214860 A1* | 7/2022 | Jenkins | A01K 29/00 |
| 2023/0309510 A1* | 10/2023 | Trottier | A01K 15/027 |
| | | | 119/51.02 |

\* cited by examiner

Interaction Facilitation System 1009

Animal User Store
1101

Speech Parts Options Module
1111

Human User Store
1103

Next Choice Prediction Module
1113

Speech Parts Store
1105

Best Practice Recommender Module
1115

Communication History Store
1107

Feedback/Results Module
1117

Interactions Log
1109

Notification Module
1119

COMMUNICATION SYSTEMS AND METHODS FOR ANIMALS

CROSS-REFERENCE TO RELATED APPLICATIONS

This application claims the benefit of U.S. Provisional Patent Application 63/195,032, filed on May 30, 2021, which is incorporated by reference herein in its entirety.

FIELD OF THE INVENTION

The present disclosure is interdisciplinary, relating to augmentative and alternative communication, animal behavior, and also to computer and information technology. More particularly, it relates to systems and methods for facilitating animal communication.

BACKGROUND OF THE INVENTION

Animals do not possess sophisticated language skills to the level of humans. Although there is widespread wish that animals would communicate with the clarity, precision and richness of human language, the wish is usually confined in the domain of fantasy, e.g. the dog Dug with a special collar that enables him to speak, in the animated feature film Up. Rather, many people accept it as a fact that one of the most important distinctions between humans and other animals is that humans can communicate using languages, while other animals cannot.

The Oxford Learner's Dictionary defines language primarily as "the system of communication in speech and writing that is used by people of a particular country or area". There are a few other definitions, most pointing out that language is specific to "humans", and only when used analogously or by extension would the word "language" be applied to non-human animals. This is the status quo of what humans believe about the language ability of animals.

Examples of animals appearing to speak, such as parrots making what sounds like human speech, are generally met with the interpretation that the perceived speech is simply mimicry instead of language, meaning that it doesn't reflect the animal's actual knowledge, feelings or thoughts. As a notable example of someone challenging the conventional wisdom, and reflecting the exception not the rule, the researcher Irene Pepperberg trained an African gray parrot Alex to identify objects and count, but she stopped short of claiming that Alex could use "language", instead saying that he used a two-way communications code, and within the research community there is controversy around exactly what Alex demonstrated, whether it was language or operant conditioning or simply performance by rote. After Alex's death in 2007, there has been no more prominent example of birds appearing to speak at the level of Alex.

To summarize, conventionally, animals not being able to speak is not considered a question or a problem to be solved; it is generally simply accepted as a fact.

Introduction to the Invention

But what if language abilities across animals actually exist on a spectrum, and are not simply a clear dichotomy of either "have" or "not have"? How are we to learn to what degree the perceived lacking of language abilities on the part of animals is due to many animals' limited abilities in vocalization, and to what degree due to a lacking in innate linguistic abilities, such as conceptualization, abstraction, grammar, logic, numeracy or other high-level mental processes such as self-awareness? And if animals do turn out to have some language abilities, how are we going to convince a large number of people that the conventional notion is mistaken, if they don't ever get to experience it themselves? As long as their vocalization abilities are limited, unassisted, animals are not able to communicate in human language and have difficulty demonstrating the extent to which they possess innate language abilities. This is also a problem for the millions or possibly billions of people who interact with animals daily. Regardless of how we define true language abilities, it would be practically useful and emotionally satisfying to humans (and perhaps to animals) if animals could convey information using the clearer, richer, more precise protocol that is human language to some degree, as opposed to being limited to animal vocalization, facial expressions, postures, gestures, actions and so on.

While augmentative and alternative communication devices (AAC) for humans with speech challenges exist, they cannot directly be applied to animals. Humans are expected to form grammatically sound and appropriately worded sentences that explain nuanced ideas. Further, humans often have more precise control of their hands and fingers than animals over their body extremities when it comes to interacting with a device. As a result, AAC devices designed for humans tend to assume higher cognitive functions and finer motor control than those of animals, resulting in interfaces that are too complex and too demanding for the navigation and interaction from typical animals.

Further, the question of prevalence, or the number of animals involved, in our opinion is also worth considering. One or few animals appearing to be able to speak is not improving the lives of many, plus they would be insufficient to represent the group or species, since the few examples could be results of misunderstandings, misinterpretations, flukes or simply the blind luck of having found an animal Einstein. Regardless if animals turn out to have much language aptitude, prevalence is of interest: if animals do turn out to have language aptitudes beyond the conventional notion, then the conventional notion needs to be overturn, but a large number of people will not readily acknowledge the aptitude of animals, if their first-hand experience contradicts that of researchers. We need a large enough sample size to test a statistical hypothesis, but it is often true that we need an even larger sample size, perhaps a much larger one, to establish a statistical fact among the population. But if the animals have minimal language aptitudes, then, given statistical methods tell us that the smaller the effect, the larger the sample size required to establish the effect, this means testing a lot more animals to establish the amount of language aptitudes they have. Hence, either the effect is strong and many animals need to be recruited to challenge the conventional wisdom, or the effect is small and many animals need to be recruited to establish the small effect. Prevalence is of interest.

Although there are sporadic reports of simple recorded physical buttons being used to train household animals to associate buttons with speech segments, and some even appearing quite successful, as in the case of speech language therapist Christina Hunger and her dog Stella who can use 45+ words with creativity, we think such systems have challenges getting widely adopted, for reasons such as portability, space required, and lack of flexibility, preventing adaptation and improvement on the go. The systems and methods we invent are convenient, easy to use, and flexible for customization and improvements, so that it's plausible they can be adopted widely. Based on this invention, many more people and animals can be involved in the communication, so as to build up the collective statistics to shed light on animal language, for knowledge sharing to occur, for finding the best ways to help animals to communicate, and for easy and quick dissemination of improvements in the design and approaches, once new knowledge surfaces.

The disclosure here are systems and methods designed to mitigate difficulties in communication for animals, and it has many advantages regarding convenience, ease and flexibility.

Inclusion of matter within a given section is not an admission or acknowledgement that the matter is prior art, and should not be so construed. These discussions are intended to provide context so that it might be helpful to those skilled in the art to understand the inventions. While we discuss background material, for example in the background and introduction sections, we may discuss problems that were previously unidentified until we identified them for the disclosure here, and we may also discuss novel, non-obvious and useful aspects of our inventions.

SUMMARY OF THE INVENTION

This disclosure is on systems and methods for helping animals to communicate using human languages.

Some terms and abbreviations as used herein are defined below, to avoid repetition. These are not necessarily standard or known definitions, and the definitions supplied here may include aspects of the invention that are novel, nonobvious and useful.

Animal user: As used herein, the term "animal user" is broadly defined to include any animal that interacts with this invention.

Human user: As used herein, the term "human user" is broadly defined to include any human that interacts with this invention. Human users interact with this invention for many reasons, including to set up for the animal user, to obtain information, to train the animal users by showing how to interact with the buttons, or to communicate with the animal users.

Button: As used herein, the term "button" refers to a visual object on or in the display that can be interacted with by an animal user. A button doesn't need to look like a traditional button. Indeed it could take any shape, or simply be an unmarked area of the display. It could contain drawn, photographed, synthesized (e.g. generated or modified by an artificial intelligence) picture, graph, video, animation or 3D model. In general, buttons that represent different audio speech segments (see definition below) are visually distinct so that it's easier to distinguish them; but it's also possible to keep them looking the same and rely on their different positions on the display to distinguish them.

Touch: As used herein, the term "touch" when in the context of "touch a button" refers to interacting with a button through a gesture towards the display. If the location of a gesture is also where a button is displayed, and that has been detected by the system, then it's a touch. Since buttons are not physical, it may not be literally possible to touch the button in the physical sense, and here "touch" is broadly defined, and covers interactions such as reaching for a button in a hologram.

Body extremity: As used herein, the term "body extremity" is broadly defined to be a body part that a human or animal uses to touch buttons. This may include but are not limited to finger, toe, paw, nose, snout, tongue, forehead.

Audio speech segment: As used herein, the term "audio speech segment" is broadly defined to be a segment of speech. All ways to divide up speech into segments are allowed for this definition. For example, segments could be words, phrases, phonemes or a mixture between them and any other representations of segments of speech. For the buttons that correspond to audio speech segments, overlap is allowed and indeed could be helpful, for example one button may correspond to the word "not" and another may correspond to the phrase "may not". This is because animals may have limited conceptualization abilities to notice that both "not" and "may not" contain a negation and "not" serves the function of negating. If "may not" occurs frequently in the interactions with an animal, it could be beneficial to map it to a button as a whole, despite that "not" is also mapped separately.

UI: As used herein, the term "UI" or "user interface" is broadly defined as the manner by which the systems in this invention interact with human or animal users. Since the systems include a display, the term "UI" includes how the graphical layer looks and reacts to interactions, for example, what elements are displayed, how they are positioned relative to each other, what sizes and colors they are, how they respond to touch. Some embodiments also have non-visual aspects, and in those cases "UI" also includes non-visual aspects such as vibrations, haptic feedback and audio.

The systems in this disclosure allow animal users to touch buttons on a display with their body extremities, and the systems can sense touches, so that an audio speech segment is played back corresponding to a button or buttons touched, thus the animal users are able to use the audio speech to communicate. In some embodiments, the systems also have additional functions to improve the effectiveness of training and communication. The methods in this disclosure are on training animal users to communicate, communicating with them or enabling them to communicate with each other.

BRIEF DESCRIPTION OF DRAWINGS

The following is a brief description. Details are supplied for each figure in the "Detailed Description of the Invention" section.

DETAILED DESCRIPTION OF THE INVENTION

For easier comprehension, when we discuss this invention we describe it in conjunction with some embodiments. But it should be understood that they are not intended to limit the invention to these embodiments. On the contrary, the invention is intended to cover alternatives, modifications, and equivalents that are within the spirit and scope of the invention. Also, whenever we use phrases such as "for example", "such as" or "etc." in this disclosure to give examples, it is to be understood this means "for example but not limited to", because examples are not meant to be limiting. Furthermore, while we provide numerous specific details, they are meant to provide a thorough understanding; they are not to imply these aspects being detailed are necessary. In some instances, details provided are sufficient for those skilled in the art but not exhaustive to the extent that interrupts the flow of comprehension. These conventions are intended to make this disclosure more easily understood by those practicing or improving on the inventions, and it should be appreciated that the level of detail provided should not be interpreted as an indication as to whether such instances, methods, procedures or components are known in the art, novel, or obvious.

Here we present systems and methods that allow animals to use touch to generate speech. See the definitions in the Summary section for "animal user", "touch" etc.

Figure 1:
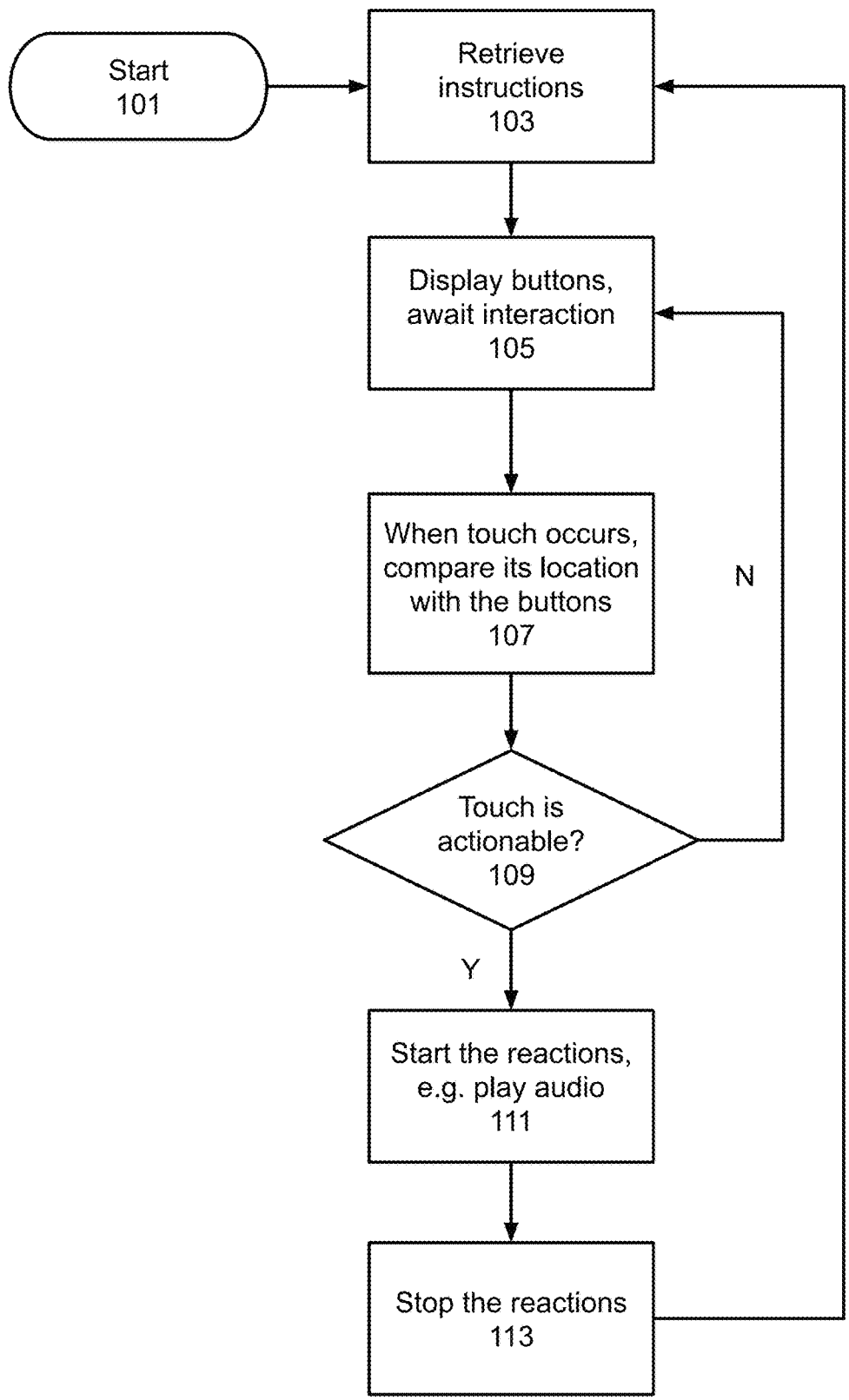
FIG. 1 is a flowchart explanation how the system works in one embodiment to prepare for and process a touch event.

One embodiment of such a system includes a touchable display that is able to both display and sense touches. Animals can touch visual objects, also called "buttons", that are displayed with a body extremity. If the button touched corresponds to a speech segment, then the speech segment gets played back after the touch, or after a few touches, when the speech segments get combined together for playback. The system also includes a processor that controls the input and output of the display and audio playback and makes calculations, such as determining if a touch did in fact fall onto a button or outside of a button. This is not to mean these devices necessarily need to appear to be separate; it merely means the functions fulfilled by these devices should be present in the system. Hence, these devices could be housed or fused together so as to appear to be one single device only. Similarly, other components that are included in some other embodiments, as explained in the rest of this disclosure, can also be housed or fused together into one device. Separate or together, these are all valid embodiments for this disclosure. FIG. 1 presents a flowchart of one embodiment on how such a system receives a touch input and responds, to instructs persons skilled in the art on how to reproduce a version of software that works on this system.

In FIG. 1, the system starts by retrieving a set of instructions on what buttons to display and how to show the UI. These instructions may have been separately determined based on a set of rules or a model but are now set in the system. The processor then causes the display to show the buttons according to the instructions, in addition to waiting for a touch event to trigger the next steps. When touch does occur, the processor determines if the touch is on any button, or if it falls outside all buttons. If the touch is in fact on a button, then the processor starts the events in reaction to the touch: it determines that the waiting for a touch event has ended, causes the audio output device to play the audio speech segment corresponding to the button (or, in some embodiments, waits for a few touches before playing combined audio segments), and optionally causes the display to send some feedback, such as animations or vibrations. After an appropriate amount of time, the processor determines that the reaction events have ended, so that it loops back to retrieve instructions on what buttons to display and how to show the UI again.

Humans interested in training the animals can show the animals how to touch the buttons, and also show the animals the outcomes or consequences of these buttons being touched, so that the animals associate the button touches with the outcomes. For example, if the button "go outside" is touched, human users can lead the animals outside. The goal is for animal users to comprehend the speech to a certain degree, after enough repetitions.

Figure 2:
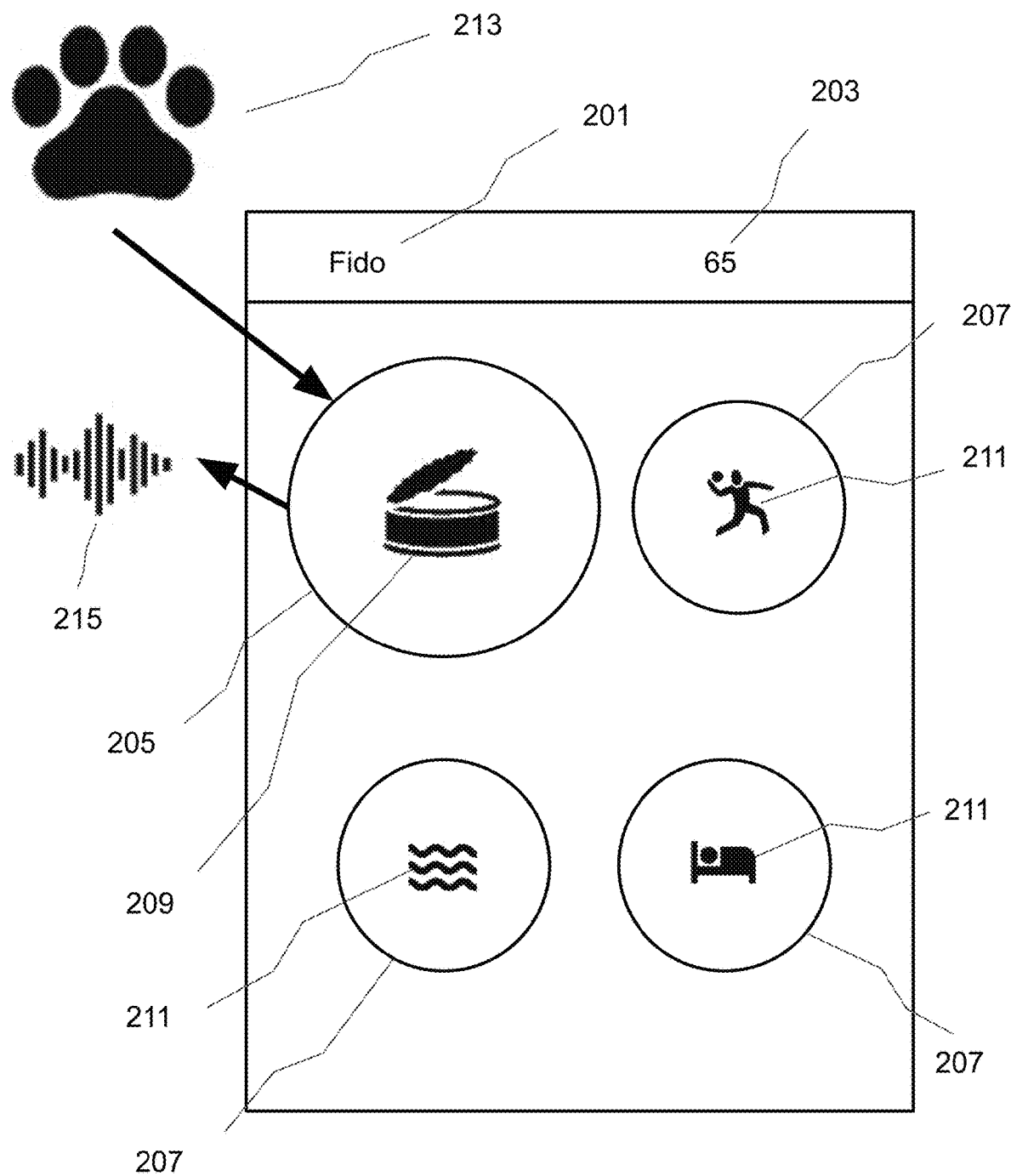
FIG. 2 is an example of an animal-facing UI in one embodiment. All elements, functions and features of the user interface need not be all housed on the same device. The buttons don't need to have a circular shape or have borders around them. We add circular borders to the buttons in this and some other monochrome figures in this disclosure, so that it's easier to see.

Since the systems in this disclosure cater to animal users, animal-facing UI, the manner that the system presents itself to animal users and receives input from them, is designed to be suitable for animals. An example of an animal-facing UI is shown in FIG. 2, where the largest rectangle represents the user interface on the display the arrows indicate interaction and feedback

201 shows the name of the animal user

203 shows the number of times the animal user has interacted with this system

205 is an button that has just been touched (for FIG. 2 we call that "activated"), corresponding to a speech part that has recently been chosen; in some embodiments such a button displays animation as visual UI feedback

207 is a button that's not activated, corresponding to a speech part that is not chosen; in some embodiments such a button is animated on standby

209 shows the symbol on the button being expanded during visual UI feedback

211 shows a symbol on a button that's not activated

213 is a body extremity of the animal user that touches the display

215 is an auditory playback corresponding to the chosen speech part

While "animal-friendliness" exists on a spectrum, unless an UI is designed for the use of animals, it's unlikely it would work well with animals, because animals have different cognitive functions and control their body extremities differently from humans.

For the visual aspect of animal-facing UIs, which is the manner by which a system displays itself visually, the design considerations include, for example, inclusion and exclusion of visual elements, deciding the color, shape, size, animation and arrangement of visual elements, so that it's easy for the animal user to pay attention to the display, to comprehend and interact with the system, reducing mistakes. Here are a few examples of considerations:

1) the interactive areas or buttons are of appropriate size and spacing for the extremities that are intended for interacting, so that it's less common for animals to accidentally interact with areas or buttons unintentionally;
2) reducing non-essential elements, such as symbols, shapes and pop-up windows, so as not to unnecessarily increase the cognitive load for animals while they look at the display; while some text may be necessary for humans to remember e.g. which buttons correspond to which speech segments, superfluous text is not included;
3) reduce or remove the chance that animals may accidentally gain access to functions intended for humans from the display, for example opening up menus that change the software settings;
4) the look is clear and the buttons are distinct from the animal's point of view, since animals have different visual processing that enables them to notice and ignore different aspects of the visual world. For example, some animals are color blind or have difficulty distinguishing stationary objects, and the design may need to rely heavily on shape and animation, instead of colors, to give cues and feedback.

While one specific design is unlikely to be suitable for all animals, each individual system may be customized for certain species or an individual animal.

For a UI design to be suitable for animals, in some embodiments it's only a matter of intuition based on the intent to serve animals, with some considerations similar to those listed above. But there are also some methods to determine if a UI design is suitable enough and update the UI design accordingly. Some can be achieved manually, and some can be done through computer algorithms.

Indeed, different species or individuals likely prefer different designs, and "suitable" can mean something different for each individual animal; further, the preferences of an individual animal may change over time as it matures or gains familiarity with the system, hence it would be preferable to update the UI design based on new information. These methods can generally be described as testing UI designs on animal users and then updating the designs as needed. As an example, an embodiment that can be performed manually or algorithmically is shown in FIG. 3.

Figure 3:
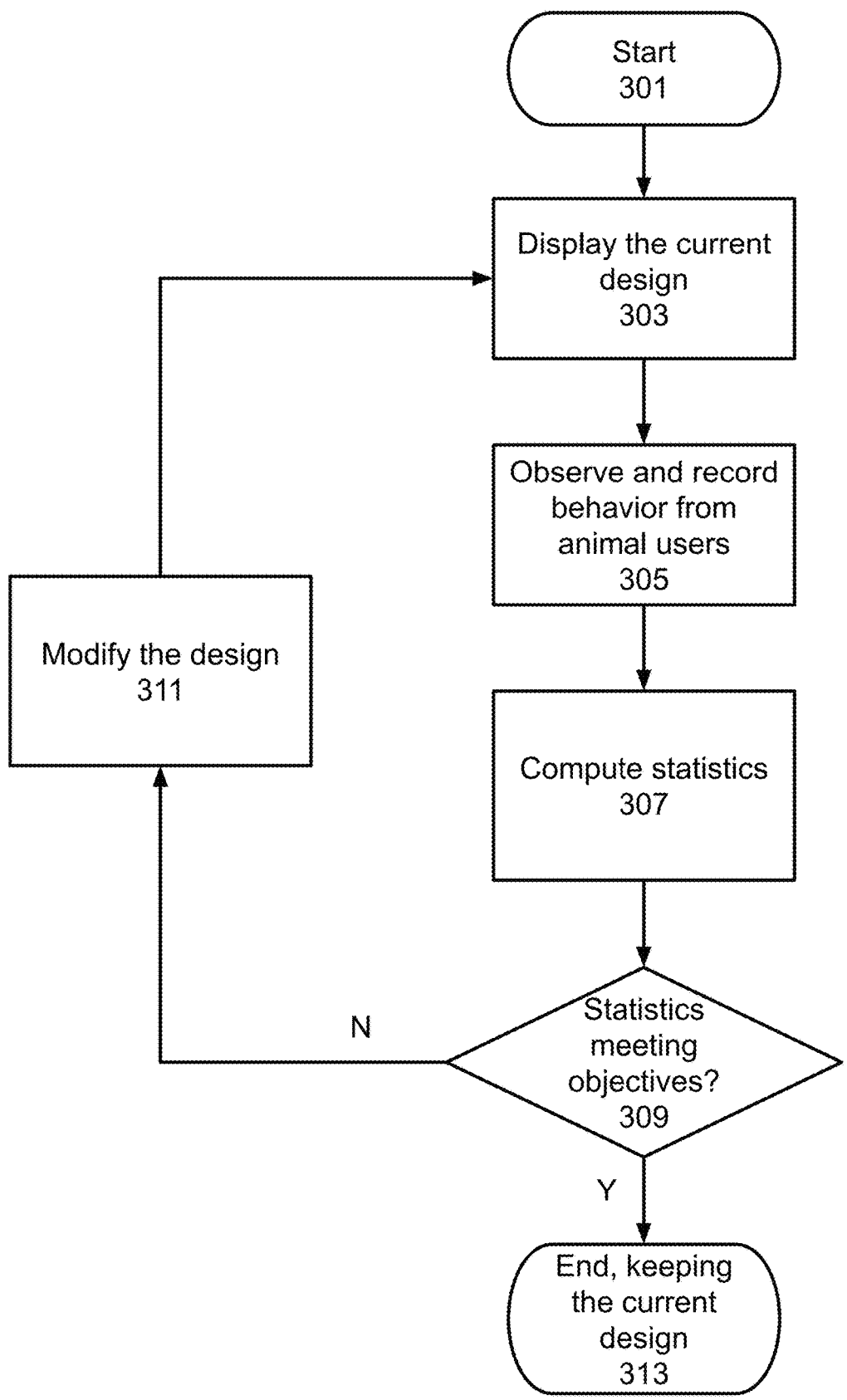
FIG. 3 presents a method of testing UI designs on animal users and then updating the designs as needed in one embodiment.

In FIG. 3, the system first displays some UI design; it then collects user data from animal users, this may include: how often animal users touch UI elements that are not interactable buttons; how long animal users hesitate before touching the user interface; how often animal users touch buttons unintentionally; how off-center the touches are relative to the center of the intended buttons. Performance statistics based on such data can be computed, such as the ratio between effective touches to accidental touches, average duration of hesitation. With a predetermined target range for these statistics, it can be determined at 309 if these performance statistics meet the threshold for acceptance. If not, the UI design can be updated, and testing restarted, until the objectives are met. This process, when performed algorithmically, can be carried out without human intervention: in some embodiments, the UI updating process can be automatic, when the animal user interacts with the system repeatedly. This update process can be carried out before language training starts, or during the training process; it can also be run periodically or continuously, to capture changes in the preference of an individual animal overtime.

With multiple changes in the UI design for the same animal user, a model can be built on the interaction data between the animal user and the various UI designs, to predict the performance of new UI designs for the animal user. The model results can be applied manually or automatically by an algorithm, or be applied as a set of rules, to guide the updating of the UI design. This is a subcase of the more general case explained in the following paragraph, where interaction data based on multiple animal users are used to build models. To reduce repetition, we omit the full explanation here but will give a detailed explanation to the general case. The treatment of this case here would be readily clear for those skilled in the art who read the treatment in the general case below.

Figure 4:
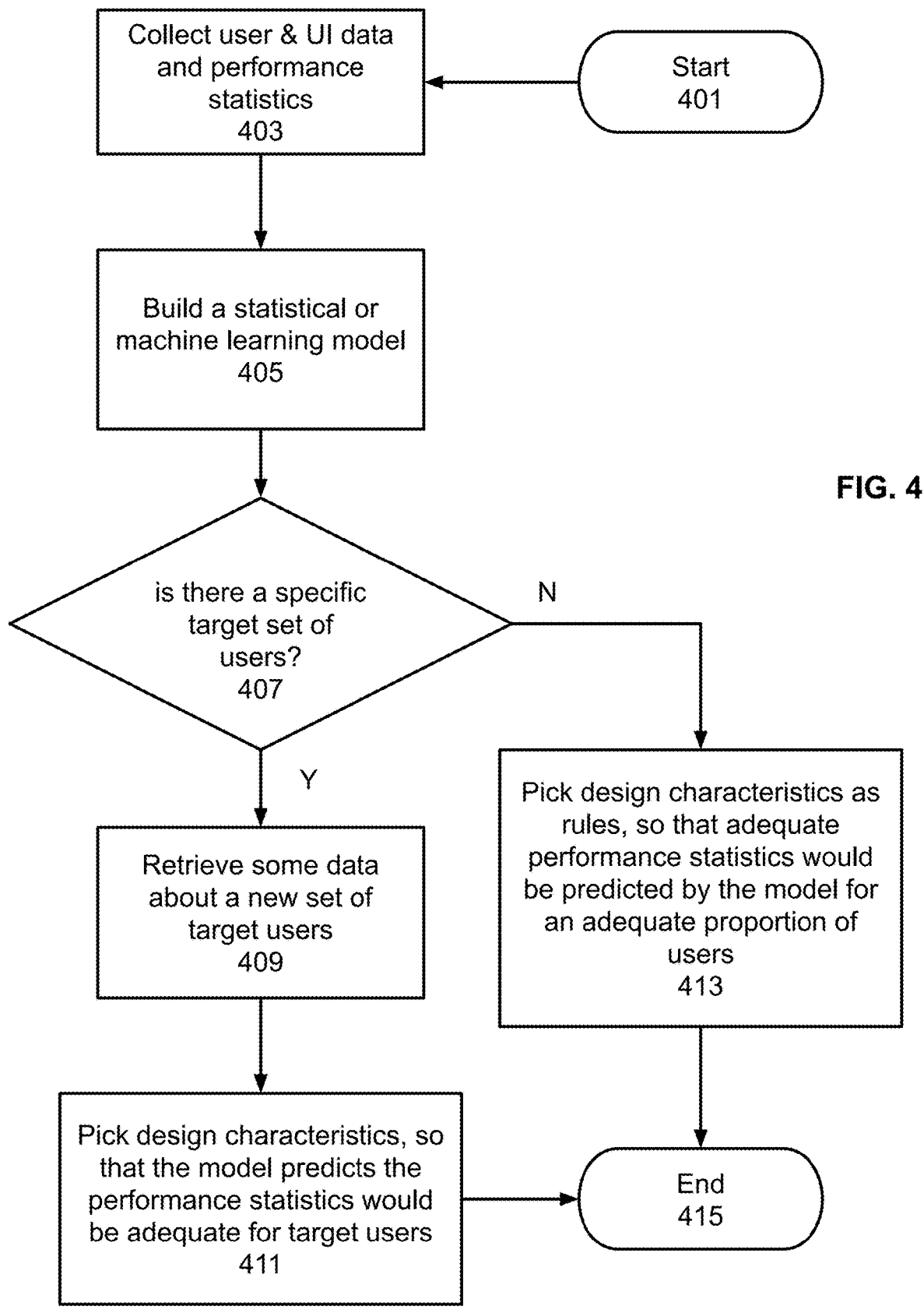
FIG. 4 presents, in one embodiment, a method of using data collected from multiple interactions to select suitable UI designs.

With data from multiple animal users interacting with multiple UI designs, a set of rules or a model can be built to determine if a UI design is likely going to meet the objectives. For example, the following data could be collected about some past interactions: a) about the animal users, such as species, height, age, diameter of their body extremities, combined with b) data about the display and the UI characteristics, such as size of the display, number of non-interactable elements, sizes of buttons, distance between buttons, further combined with c) performance statistics in these interactions. A statistical or machine learning model can be built on a combination of aforementioned data, to determine the likely performance statistics for any new combination of animal user and UI characteristics. Then, one simply needs to apply the model to select an animal-friendly design for any system. FIG. 4 is one embodiment of such a process.

Since in this disclosure we'll mention machine learning a few times, here we give a synopsis on what that is and what it can do. Fundamentally, machine learning is a special branch of statistical methods. It involves making guesses, usually called "predictions", based on a multitude of data. The type of machine learning we mention in this disclosure is usually "supervised learning", meaning data collected about past experiences are all tagged with a "label", or outcome, in each case. Hence, the data illustrates, for each past scenario, its context and its associated outcome, and based on that, using some well-known algorithms, we can make a prediction on the outcome for a new scenario, if we know its context, even if we haven't encountered it before. The predictions we make using machine learning are frequently quite good, although the quality of the prediction depends on the quantity and quality of the data used as input to the machine learning models. In fact, machine learning models often perform to a super-human level. Machine learning can also be applied to a large variety of data, not just numerical or categorical ones. For example, pictures and videos in their digital forms are also data, and machine learning algorithms in general can classify them (e.g. deciding who is in the picture, or what type of animal is in the video, which we'll mention in one of the embodiments) quite reliably. In recent years, in many cases one of the reasons certain technology products work so much better than before is that machine learning algorithms are fueling the predictions, such as guessing which video you'd like to watch next, what types of posts or news articles you'd like to read. This is in the same manner as predicting which buttons an animal user would like to touch next, or what color and size of buttons the animal user is more likely to work well with. Since those skilled in the art are quite familiar with how machine learning works in the contexts we present here, we find that explaining the fundamentals about the machine learning algorithms themselves is frequently superfluous, although we supply all other details such that in the hands of those skilled in the art, it should be sufficient to reconstruct the embodiments in the disclosure here.

In FIG. 4, after the model is built, to determine what UI characteristics to use for a new, uninitiated system, one can plug in data about a new animal user or average animal users that the system caters to, and vary the UI characteristics, until the model calculates to some performance statistics that are satisfactory. If target animal users are not specific, and the new system simply aims to cater to a sufficient proportion of general animal users, then one can also refer to the existing data and pick UI characteristics that can meet performance criteria for a sufficient proportion of known animal users; these UI characteristics thus picked are hence acting as UI design rules for the new system. In some embodiments, with predetermined performance criteria, the UI updating process can be automatic without the need of human intervention, after multiple animal users have interacted with the system repeatedly.

Figure 5:
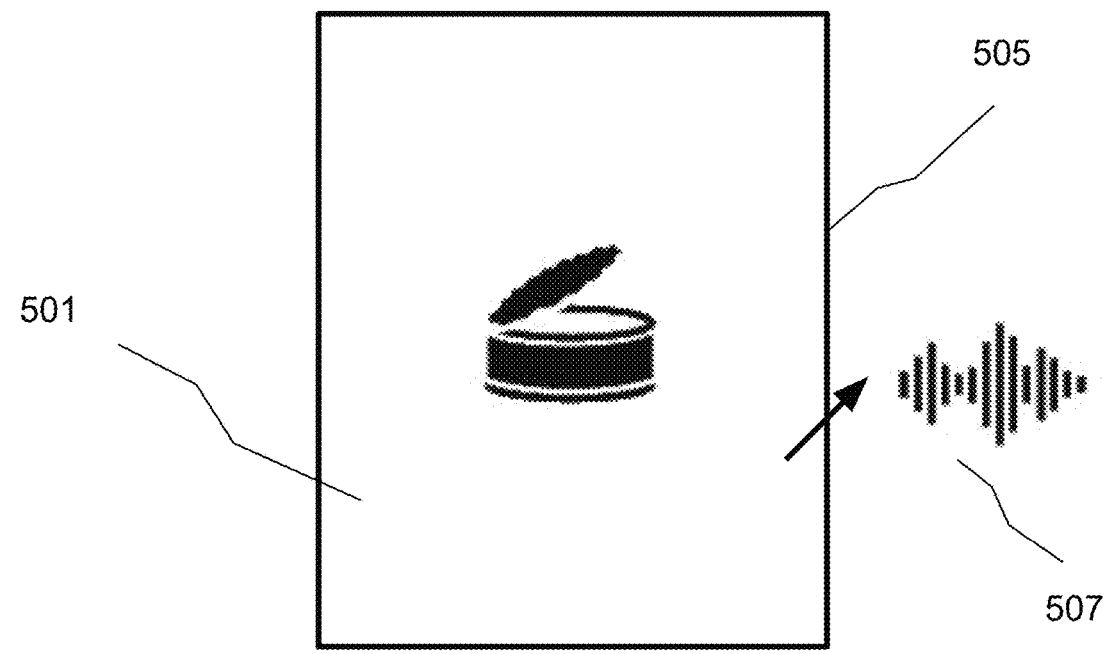
FIG. 5, FIG. 6 and FIG. 7 are some examples of animal-facing UI designs where considerations of suitability for animals have been applied in some embodiments.
Figure 5:
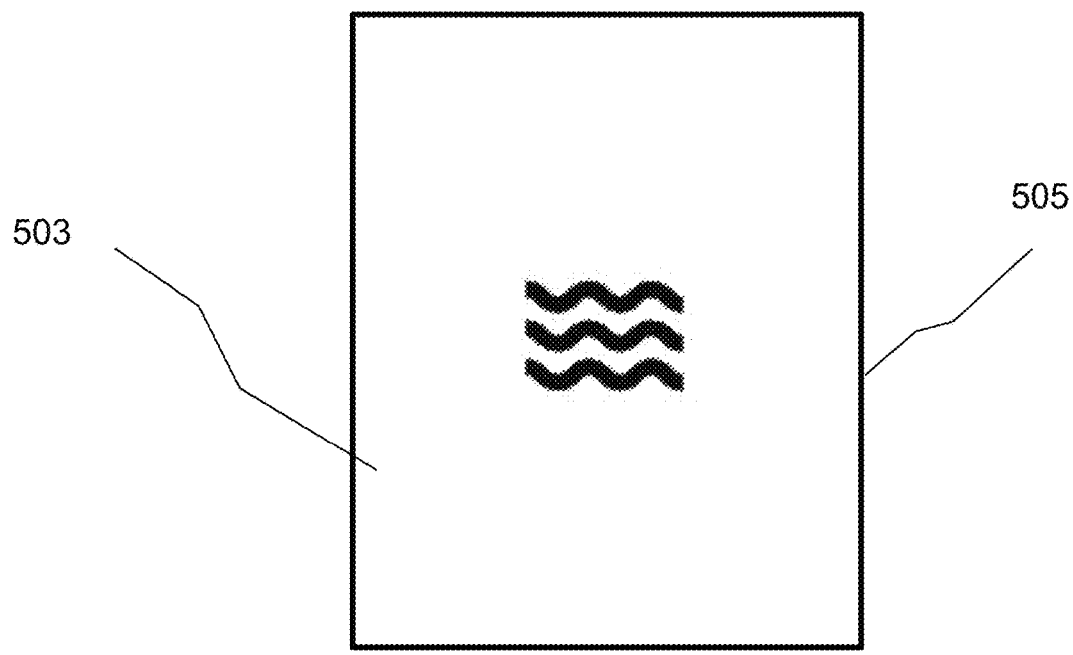
Figure 6:
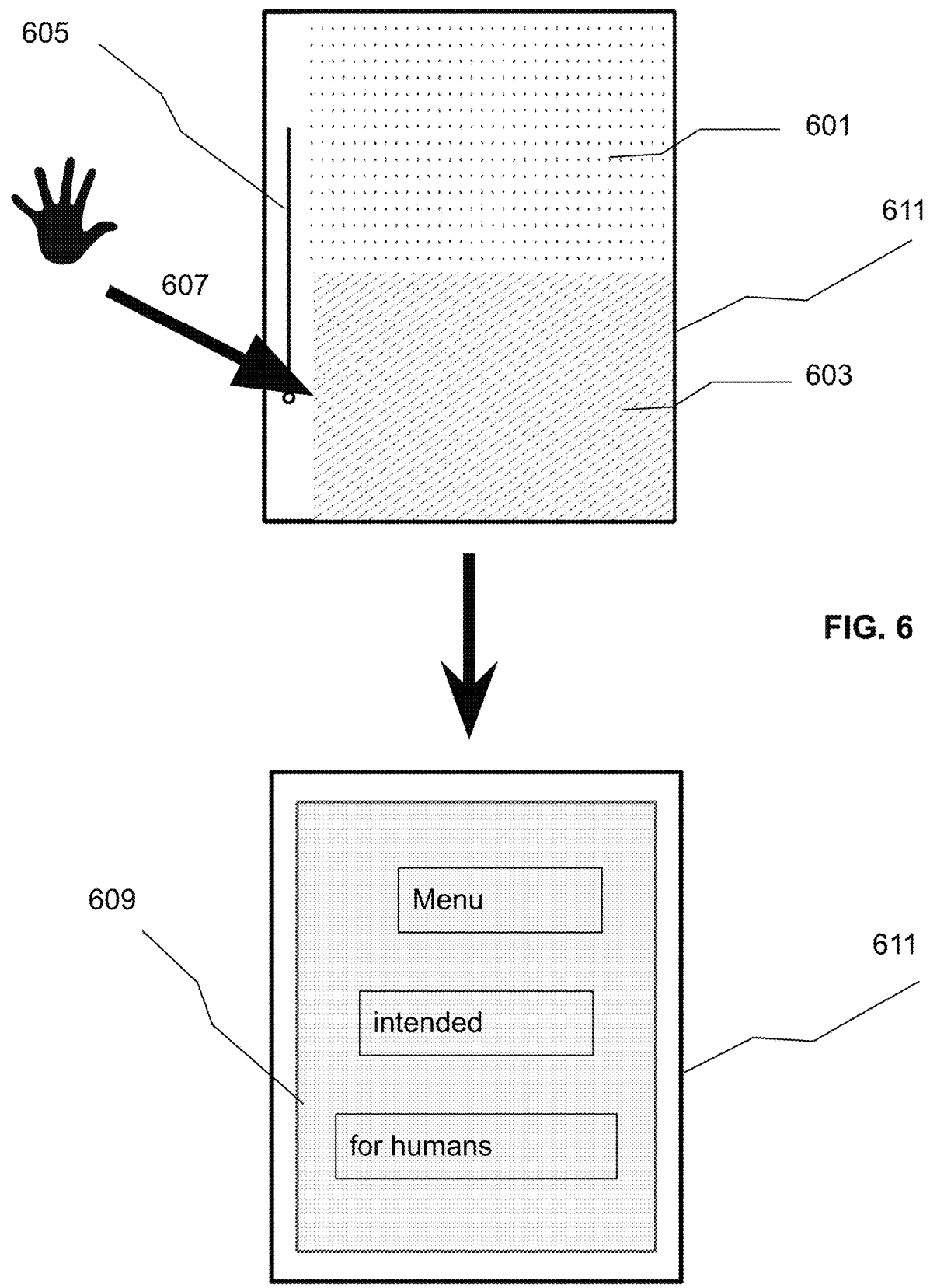
Figure 7:
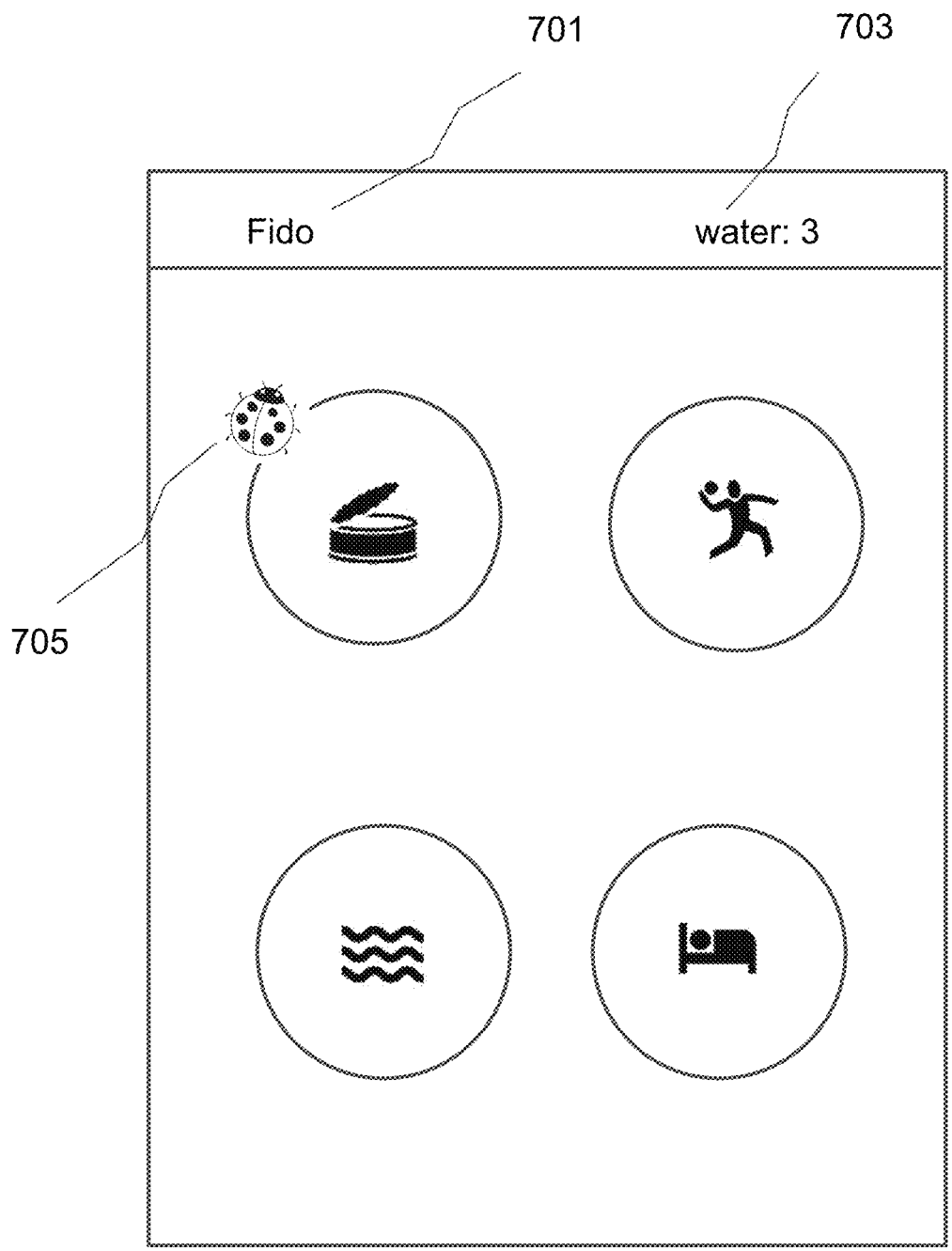

FIG. 5 to FIG. 7 are some embodiments of a few UI designs that incorporate animal-friendly considerations. They are intended to show some flavor of the types of UI that may be functional for animals; the embodiments in this invention are not limited to these particular UI designs.

In FIG. 5, the entire display, denoted by the rectangle 505, is covered by one button at a time, and all buttons are displayed consecutively, after staying on the display for a while. The arrow 509 denotes transition over time, here the transition from full-screen button 501 to full-screen button 503. An animal isn't likely to accidentally touch a wrong button on the display, unless it touches the display exactly at the time of button transition; and the system can, in some embodiments, disable button touch immediately before and after transition to prevent such accidental touch. The animal user also won't accidentally touch anything that may open up a menu for human users. In some embodiments, the menu for human users can be opened up by voice commands. In addition, in this embodiment, at system start, the system also plays sounds 507 tailored to the species of the animal, for example happy-sounding meows or barks, to attract attention from the animals.

In FIG. 6, there are two buttons, 601 and 603, respectively covering most of the upper and lower half of the display 611, shown for an animal that can consistently distinguish touching either end of the long side of the rectangular display. In this embodiment, there is also a slider 605 that, upon dragging steadily with a finger along the full length of the slider rail (the action is denoted by arrow 607), would open up a menu 609 intended for human users. Many species of animals would lack the cognitive function or dexterity to accidentally drag the slider up.

The display interface In FIG. 7 is able to accommodate four buttons, and the animal user it caters to is able to touch any of them accurately in this example. This drawing is better interpreted as a frame in a video, because the buttons this figure represents are not stationary—they are animated: exhibiting changes, for example in size, color, location, speed, transparency, orientation to attract attention and distinguish from each other. One button also has a smaller icon 705 that travels around it, to further attract attention. The display interface also contains a few additional elements that are useful for the human user: the identity of the animal user 701 (in this case, "Fido"), since the human user works with multiple animals, and it helps to be able to confirm that the system has recognized the correct animal user; the expected number of training interactions that the animal user still requires to master a speech segment (in this case, the word "water"), 703. Not all elements unnecessary for the animal user need to be excluded from the interface, but it helps to make them unobtrusive.

Figure 8:
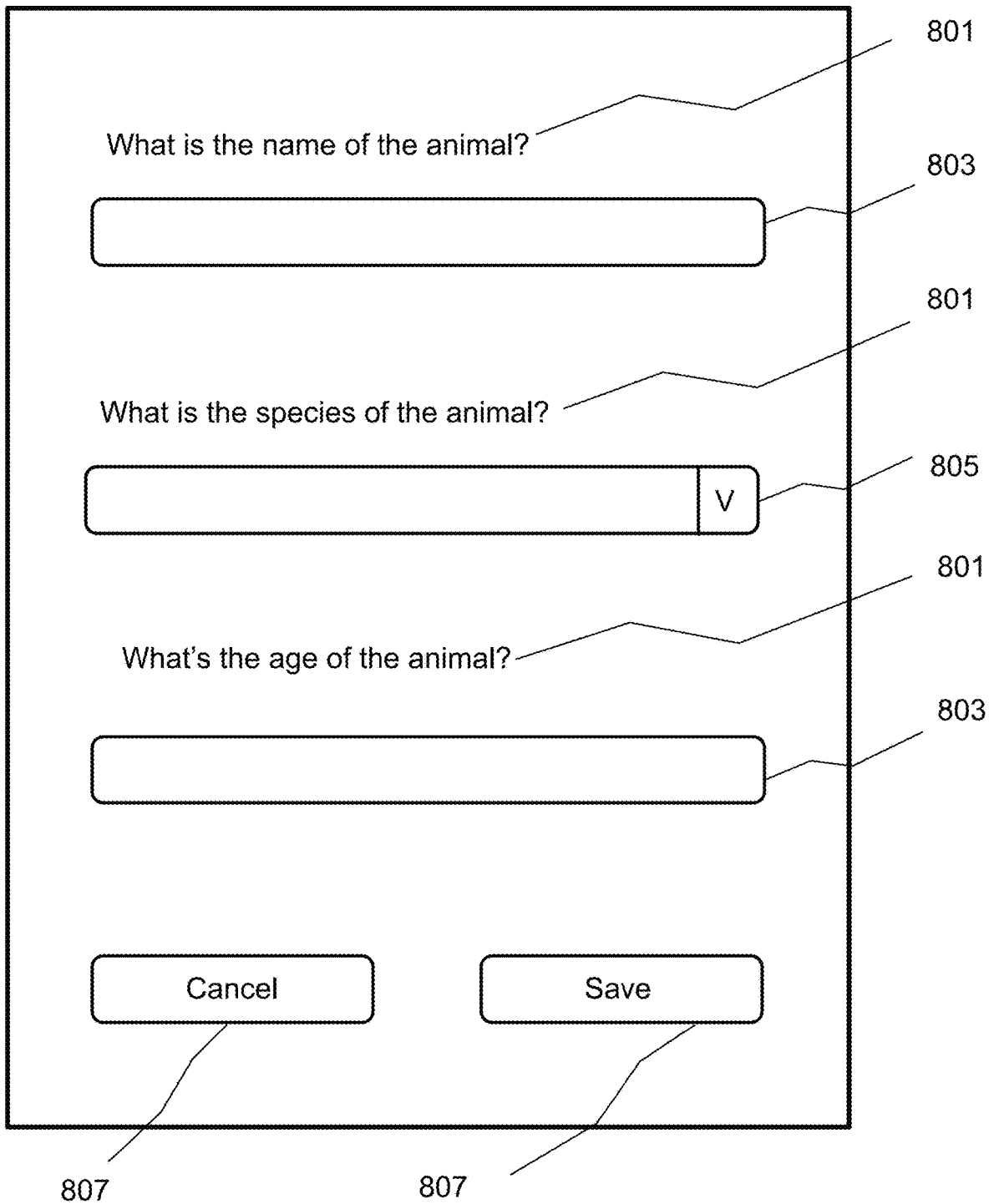
FIG. 8 is an example of a party of human-facing UI in some embodiments.

In some embodiments, there is also a distinct UI specifically catering to human users, meaning the UI is configured to display and interact in a manner suitable for human users. This is for purposes such as inputting information, receiving guidance and tips, checking the progress of the animal users and planning the next training sessions. While the animal-facing UI could be used by human users as well, the human-facing UI is intended to complete functions that are beyond the capabilities or objectives of animal users. Human users could use the UI to directly make decisions about the system, for example, how many buttons to display per screen, or whether to increase the pitch of the audio playback. The information input or the choices human users make can also be stored and later used for analyses and modeling. FIG. 8 shows, in one embodiment, one example page on the human-facing UI that requests information input about the animal user. On this page, guided by some prompt texts 801, there are text/number input boxes 803, a drop-down select list 805 and progress buttons 807 to accept human user input. Such information, as discussed before, are useful for determining various aspects of the system, such as how to customize the UI and deciding what buttons to display or highlight for the animal user.

As mentioned in the paragraphs before, to build statistical or machine learning models data is needed. Data can be stored locally or on a network server or both. Hence in some embodiments the system may include a data storage device. And in some the system may include a data transmission device connected to a network server. They are useful for recording various aspects of the context data, for example what human users input in the system, which button was touched, timing, duration, location of touch on the display, GPS location of the system. The data mentioned here doesn't have to take the raw form, meaning the original form when it was first recorded. Frequently, data used for analyses or modeling goes through some kind of transformation before being stored, for example certain aspects are discarded, others combined, averaged, aggregated, cross-referenced with other data, etc. While to fulfill their specific functions some other components of the system, such as the processor, may also have their own integrated memory, the data storage here is meant to store general data not specific to the functions of those other components.

Some embodiments have sensors and other devices that measure and record the context data, such as GPS.

In some embodiments, the audio speech segment is pre-recorded by the human users. In those cases, the system can include a recording device that records human user speech to any button. Alternatively, recordings can also be recorded or synthesized by unrelated devices but transferred to the system in some embodiments.

In some embodiments, the audio speech segment is pre-recorded by a human user that trains the animal user. In another embodiment, the audio speech segment is pre-recorded by someone else, e.g. a voice actor. In yet other embodiments, the audio speech segment is synthesized, e.g. using some artificial intelligence tool that powers text-to-speech. In yet another embodiment, the pre-recorded or synthesized speech is further modified for playback, e.g. with changes in pitch or formants. This is because animals may learn better from certain types of speech, much like how studies found that babies respond better to "baby talk", or motherese. Similar to the previously explained methods for selecting UI designs suitable for animals, the style of the audio speech segments can also be selected through rules or experimentation, or modified based on data collected on past interactions and current context.

In some embodiments, the audio speech segment is not played back upon button touch immediately, but are stitched together before the play back, after a series of button touches have completed. For example, if buttons represent phonemes, it may take multiple button presses combined to convey some meaning.

In some embodiments, the device determines if the current user touching the device is a human or an animal, and which species or which individual the user is. This could be achieved in various ways. For example, the system may include a camera, and the images or videos from the camera, based on an image or video classification algorithm, are used to determine the type or identity of the user. As another example, when the animal or human trainer touches the device, the device can perform a classification algorithm depending on data collected during the touch, such as the distances between the points of touch, the area size of the touch, the duration of the touch at each touch point. The classification algorithms in these examples can be machine learning algorithms, since machine learning algorithms provide some standard and powerful algorithms suitable for classification tasks in these use cases. Depending what species or individual the system detects the user to be, the system can react to different users differently, for example changing the style of the audio playback.

In some embodiments, the system is configured to run an operating system, e.g. Windows, Android or Apple iOS/iPad OS. The essential functions and some additional ones, e.g. managing the display, responding to touch, can be bundled into an application that runs on such operating systems; the said application can also be a browser, depending on the capabilities of modern browsers. In some embodiments, some other functions are run on the server, such as storing certain types of data, running certain types of computation. As an example of such an application, the inventor recently created an iOS/iPad OS/Android application called Pet-Spoke, that is able to run on iPhones, iPads and Android devices.

Figure 9:
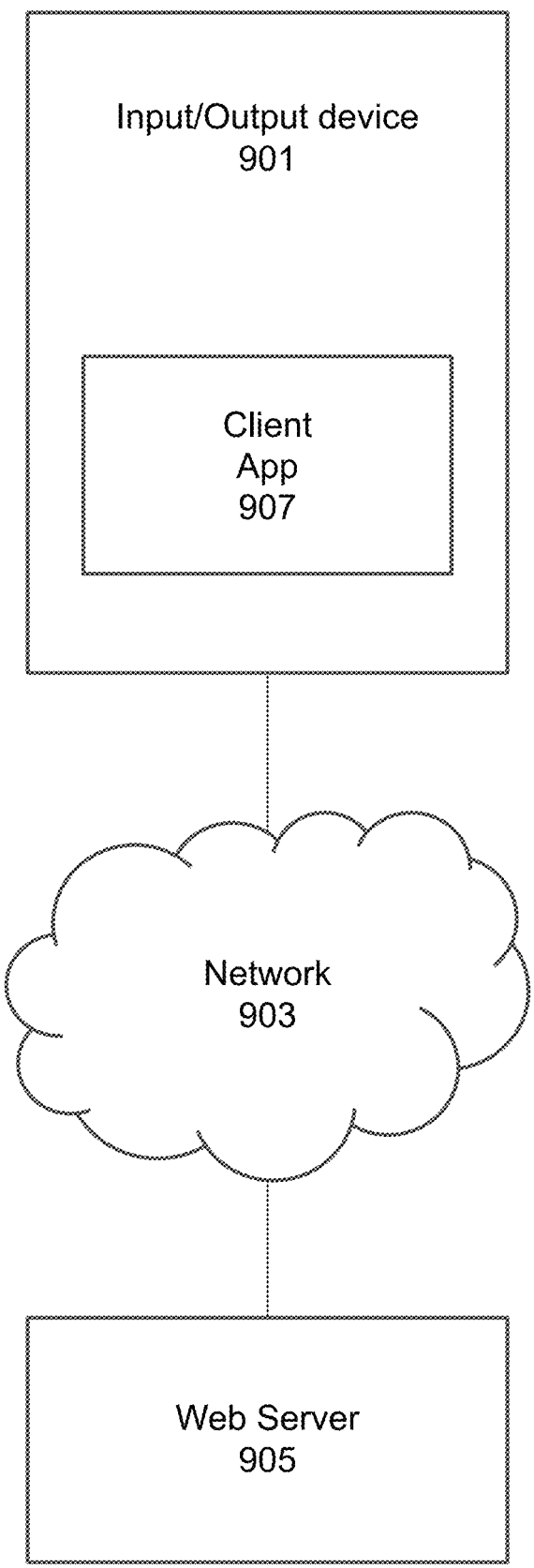
FIG. 9 is a system diagram of an embodiment of the invention that is a network-based system, the network in question can be the internet or a local network.
Figure 10:
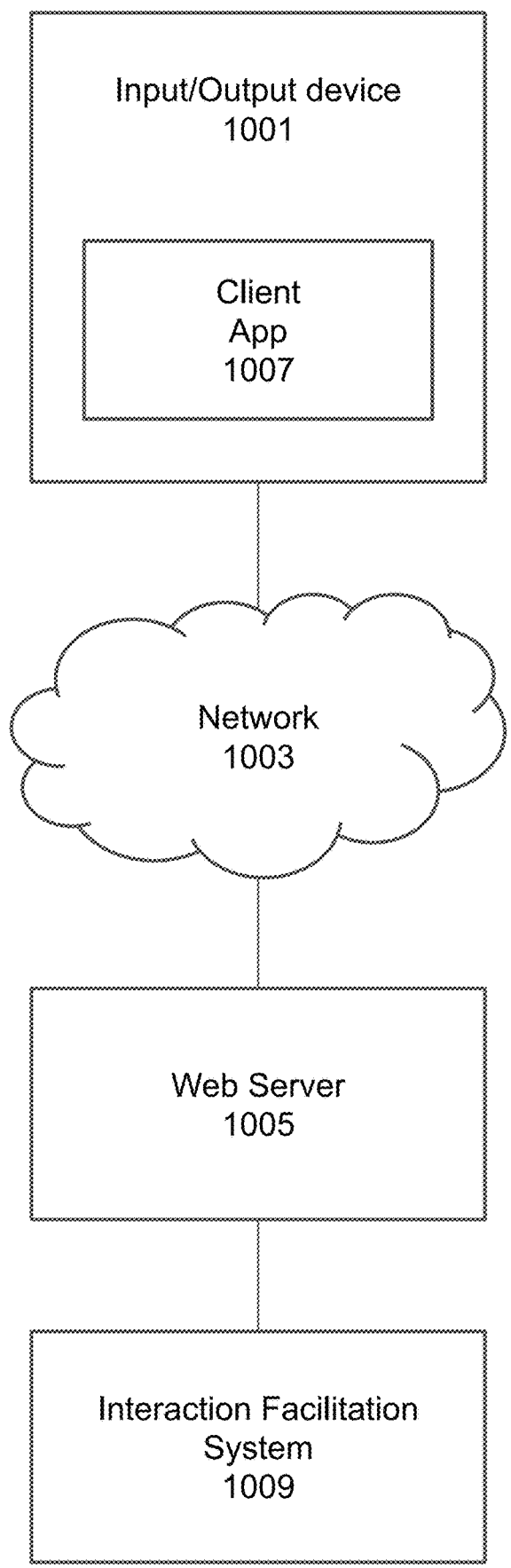
FIG. 10 is a system diagram of an alternative embodiment, which is also network-based and which also has a module called "Interaction Facilitation System" from the network. In other embodiments the Interaction Facilitation System could also be local.

In some embodiments where a local application handles certain functions and the rest are handled on a server, refer to FIG. 9 for a system diagram, where the network in question can be the internet or a local network. In some embodiments, the server in addition aggregates data from many devices and builds predictive or prescriptive models, e.g. to decide which buttons to show next or which buttons to train the animal user with. To highlight this feature, which we call an "Interaction Facilitation System" 1009, we also provide a different system diagram in FIG. 10 which separates out this logical module, although some servers are able to handle this module with the same hardware that handles other server functions. Interaction Facilitation System can also be a local module, but we omit the diagrams for embodiments where no network is involved, since this is simply to place the client and server functions all in one device.

Figure 11:
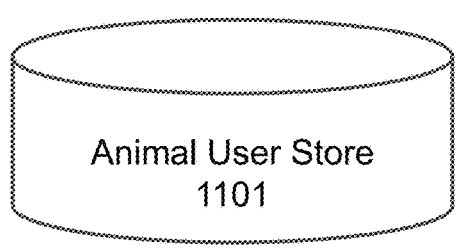
FIG. 11 is a block diagram illustrating the modules inside the Interaction Facilitation System 1009, in accordance with one embodiment of the invention.
Figure 11:
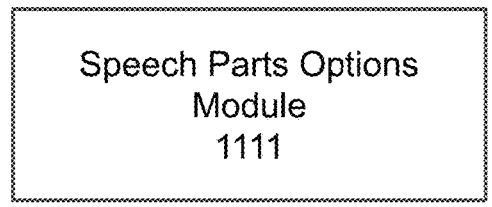
Figure 11:
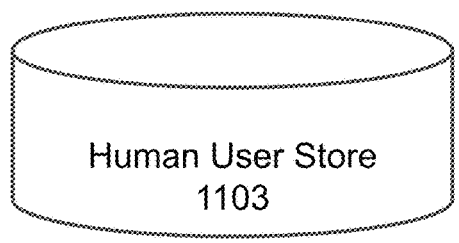
Figure 11:
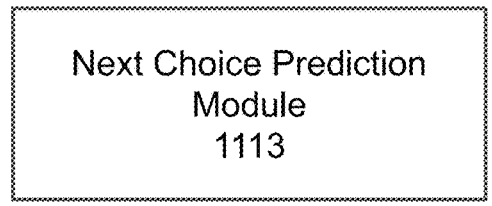
Figure 11:
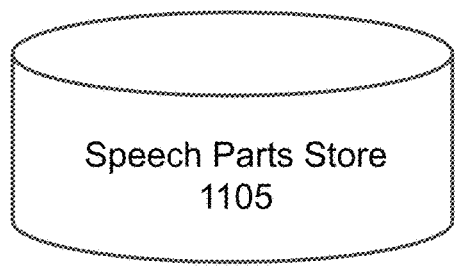
Figure 11:
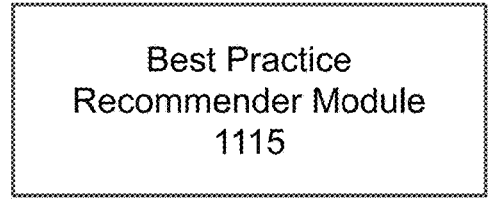
Figure 11:
Figure 11:
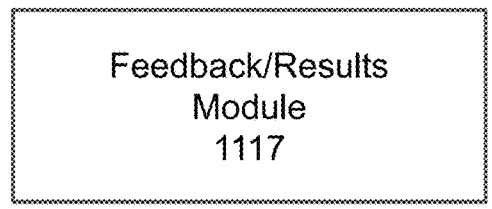
Figure 11:
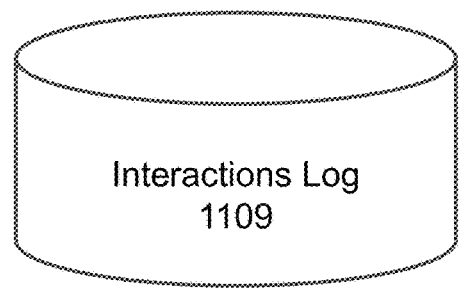
Figure 11:
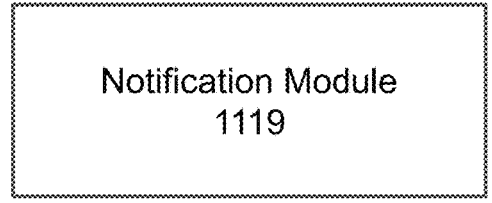

The Interaction Facilitation System takes in various types of data and outputs predictions or prescriptions based on the data, using e.g. machine learning algorithms. FIG. 11 is a block diagram illustrating the different modules that could be inside the Interaction Facilitation System 1009, in embodiments where component 1009 is present. Not all modules described in FIG. 11 need to be present in all Interaction Facilitation Systems; and Interaction Facilitation Systems may contain modules not described in FIG. 11. The input data for the algorithms may include the following: data about the animal user, which we place in a logical module called "animal user store", and a logical module doesn't need to be separate physical storage device—it is simply logically different from other types of data; data about the human user, which is placed in a logical module "human user store"; "speech parts store" stores the relationship between different speech segments; "communication history store" stores the history of animal or human communications, not necessary from the current animal or human user only; "interaction log" stores the log of interactions from the animal user.

In some embodiments, the human user chooses how to break down speech into segments, and also chooses which segments to be represented by buttons, and in what order, so that the animal user can be trained to use these speech segments. For example, deciding whether to train the animal user for the word "soon", and when to train the animal user—should training not start until the animal user has already mastered speech segments such as "go to the park" or "no" ? In some other embodiments, the system recommends or decides on these segments and their order, based on the data input to the Interaction Facilitation System 1009, so that the training would most likely be successful. This is a prescriptive task represented by the "Speech Parts Options Module" 1111 in FIG. 11.

In some embodiments, the system makes decisions regarding which buttons to display or emphasize, based on the species or individual animal user and the context. For example, certain species of animals may be more interested in getting outdoors and can also do so safely, hence buttons indicating going outdoors can be highlighted: e.g. shown earlier in the queue of available buttons, or accentuated among all buttons displayed. As another example, an individual animal's history of interaction with the system can inform the system which buttons should be or are more likely to be touched next, and the system can choose to highlight these buttons: for example if "ball" is more likely to follow "play" than "water" for a specific animal user, then the system can show the button for "ball" ahead of "water" if "play" has just been touched. In a different embodiment, the system could also decide that "with" should follow "play" more closely than either "ball" or "water", even if currently the animal user uses "with" infrequently, and in that case highlight the button "with". This means, while objectives of the prediction could be varied, a module can decide what buttons to highlight to optimize for a chosen objective, and the module is called "Next Choice Prediction Module" 1113 in FIG. 11.

Figure 12:
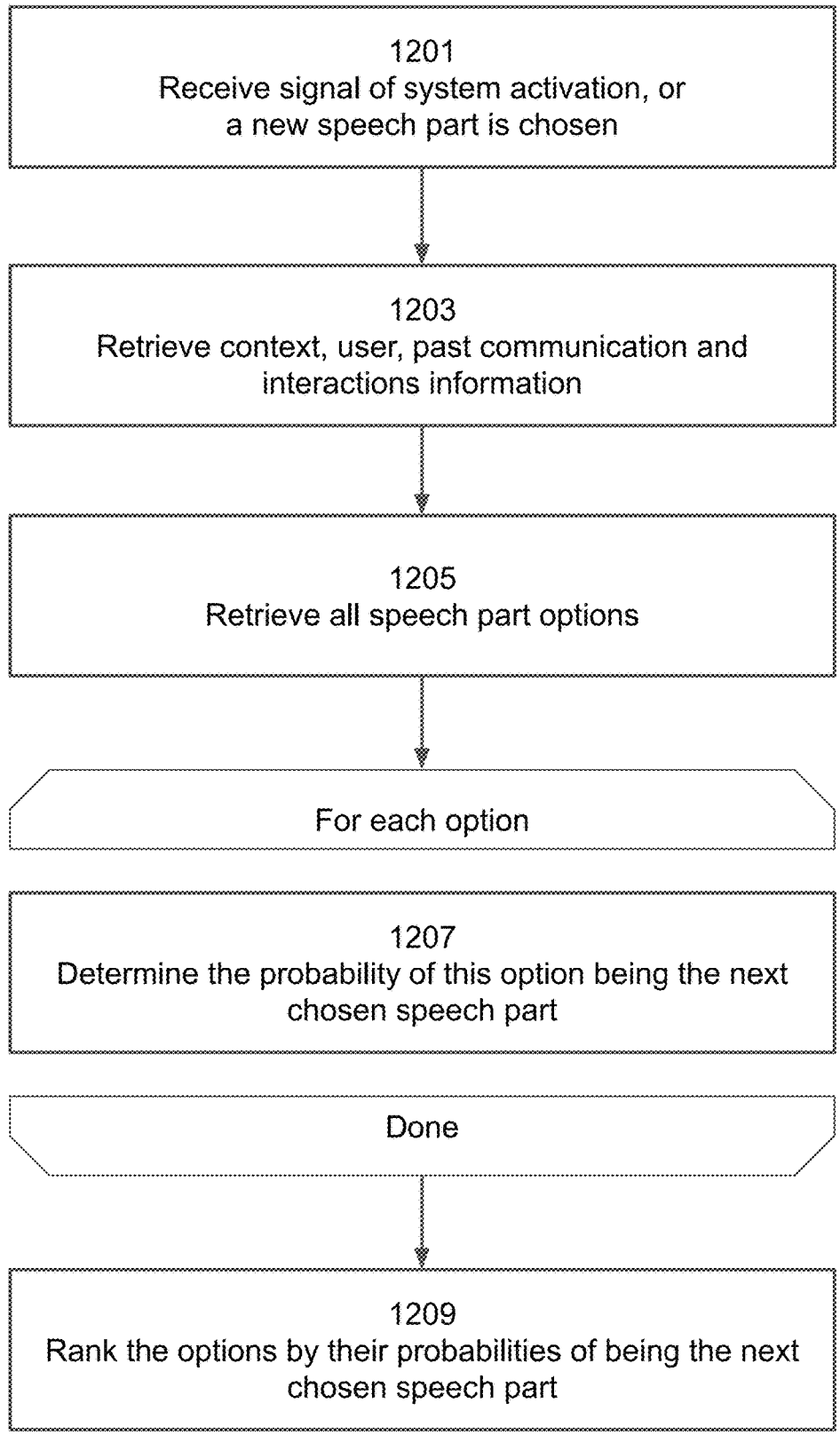
FIG. 12 is a flowchart of a method for updating the user interface according to the next chosen speech part predictions, in accordance with one embodiment of the invention.

One embodiment of the Next Choice Prediction Module 1113 is shown in FIG. 12, but not all such modules necessarily follow the flowchart in FIG. 12. For such predictions, some of the data used to build models or generate rules is similar to data used in training models to identify suitable UI designs as described above. These could be data from human user direct input or from sensors. The data could be about the species, identity and characteristics of the animal users, context information such as time and location of the device, or the history of the animal user's interactions with the input device, and history of interactions from other animal users with the same or different systems. Known statistical relationships between speech segments in natural settings (for example, "sleep" follows "go to" more often than "bread") can also be helpful, and data that supply that kind of information can usually be obtained from one of the multitude of online text corpuses. Once the data is collected, for step 1207, there are many ways to determine, for each speech part, the probability it is the next speech part, and some well-known machine learning algorithms are quite suitable here for this determination, and those skilled in the art can readily apply such algorithms.

In some embodiments, the Interaction Facilitation System may generate suggestions and tips for human users. These suggestions may include e.g. which is the next speech part the animal could learn, when to train the animal user for which buttons, how many times to train for a button, and how often to revisit the training. These prescriptive recommendations are generated by the "Best Practice Recommender Module" 1115, and one possible embodiment of this module is shown in FIG. 13.

In some embodiments, the input device serves as a dynamic guide for human users, displaying tips and suggestions generated by the Best Practice Recommender Module 1115 to facilitate training and communication. Since many human users are not speech language experts or animal training experts, guidance on techniques and directions can be quite useful. This guidance can be based on data collected on the system that the human user usually interacts with, but in some embodiments community-level data, the data on the experience of other animal users and human users, are also available. Collectively, such data could be used for machine learning modeling or statistical insights.

Figure 13:
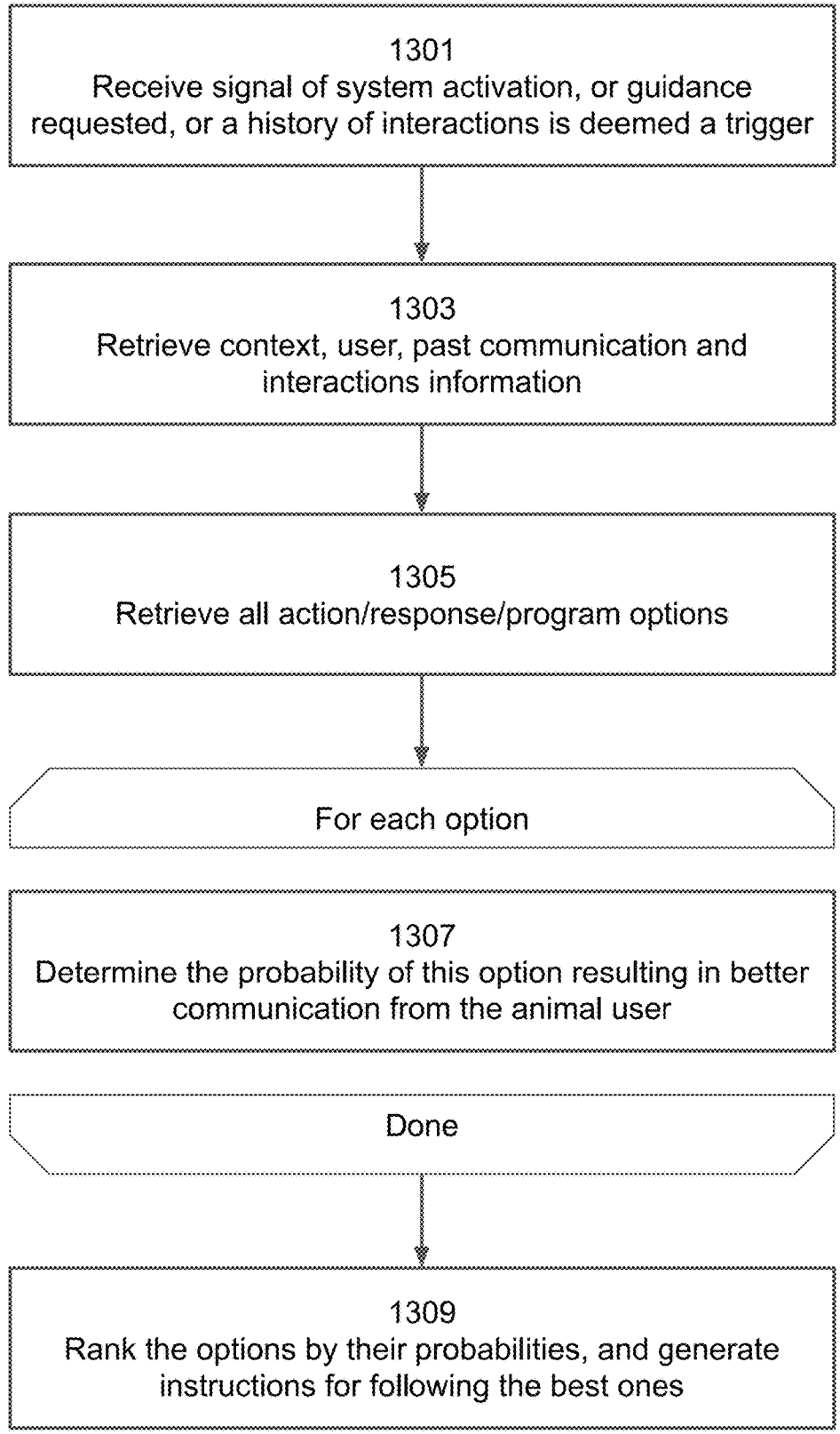
FIG. 13 is a flowchart of a method for updating the user interface according to the best practice recommender, in accordance with one embodiment of the invention.

FIG. 13 represents one embodiment of how this can be achieved. It starts up on a trigger event, such as a recent interaction, or upon request by a human user; then it collects the data needed to identify the context for providing such guidance; it then gathers the available options to choose from; it then evaluates each option based on the context and a set of rules or a model, and make suggestions to the user. The set of rules or a model in the evaluation step can be previously-built, in much of the same manner as the few other model-building processes we have discussed in this disclosure, such as the one about deciding if an animal-facing UI design is suitable, and the next choice prediction.

Once new training and communication techniques become known, in some of the embodiments where the systems are connected to servers, the update could be rapidly pushed to existing systems as updates to the Best Practice Recommender Module 1115, so that all users immediately gain enhanced abilities. Similarly, other modules can also be updated instantly for connected systems. For example, in some embodiments, conclusions about the more suitable designs for certain species can be quickly utilized through an update to the Feedback/Results module 1117.

In some embodiments, the Interaction Facilitation Systems contains a "Feedback/Results Module" 1117 that determines the presentation of UI on standby and different feedback to an interaction, so as to facilitate learning and communication. For example, the choice of a suitable UI design is among the results this module controls. As an example of feedback, if the animal user newly learns to press buttons in order that says "play", "with", "friend", instead of just "play", "friend", the system also plays a speech segment of encouragement from the human user that says "good boy/girl!".

In some embodiments, the Interaction Facilitation Systems contains a "Notification Module" 1119 that determines the content and timing of notifications to be sent to human users. For example, when the animal user has not used a button for a while, a notification may be sent to the corresponding human user reminding them to troubleshoot or reconsider the utility of that button.

Figure 14:
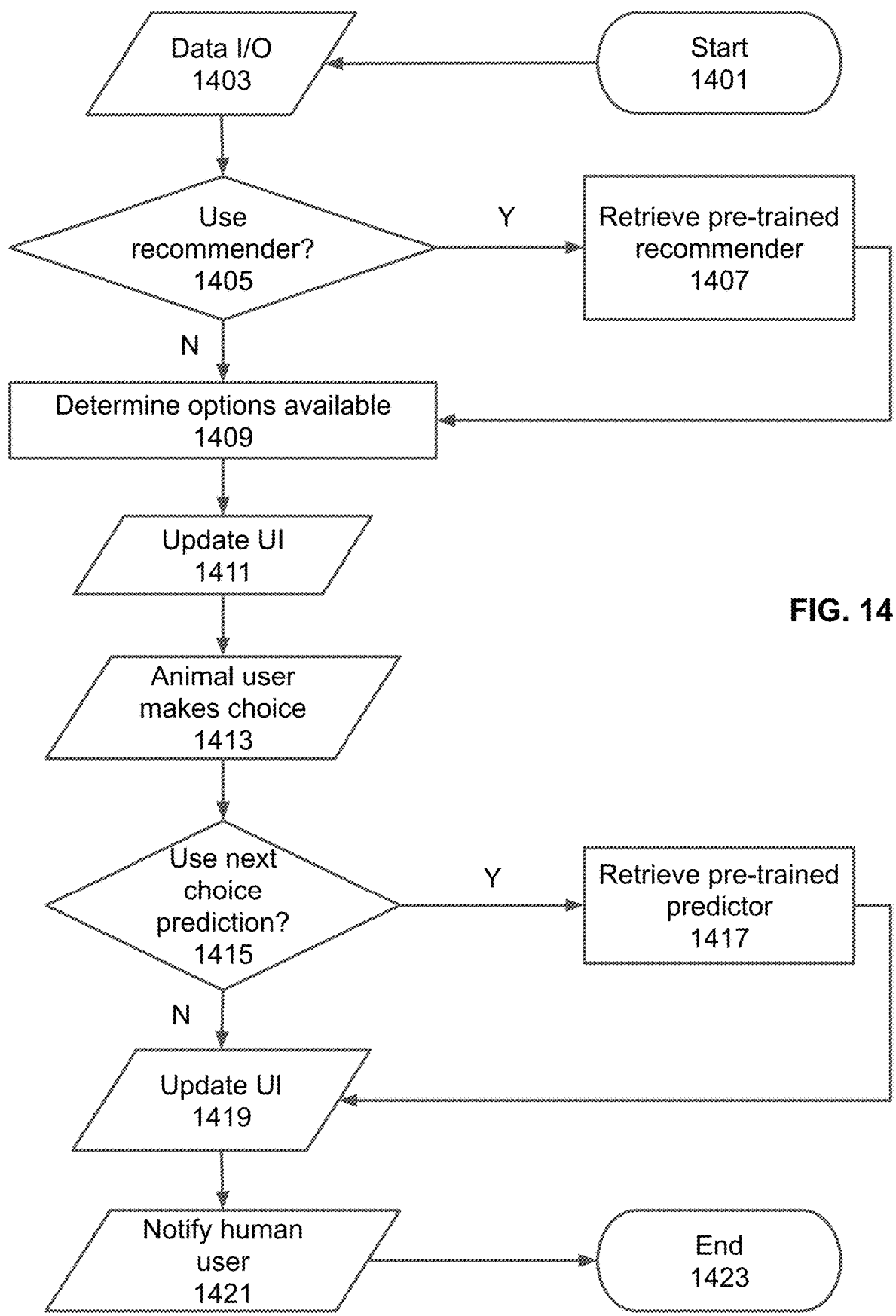
FIG. 14 is a flowchart of one episode of interaction in one embodiment of a method.

In FIG. 14 we present a flowchart of one episode of interaction in one embodiment of a method. Multiple instances of interactions can occur using any method, forming loops. Data logging, model training, and longer-term interactions with users are omitted in this diagram, since they are in FIG. 14 we are focusing on episodic interactions. Once the system starts, at 1403, it first reads any saved data, for example which animal user is expected to be using the system, to prepare for the interactions; it's also possible that the human user at this point is doing some setup, for example letting the system know that a new button is now added. The system then checks if it is expected to use a previously built recommender to decide what to display in 1405, and if so, in 1407 retrieves the recommender, which is a model or a set of rules that is used to make recommendations. If not, it simply follows a default set of rules for display. It then computes which buttons to display and how to display them, in 1409. The display updates the UI in 1411 following the results from 1409, then awaits interactions from the animal user. Once the animal user makes a choice and the system feedback is carried out, in 1413, the system checks in 1415 to see if it is expected to predict which speech segment should or would be chosen next, and if so, it trieves a model or a set of rules in 1417 to do that prediction. If not, it simply follows the default order. The system then computes which buttons to display and how to display them again, and updates the UI to present them in 1419. In this embodiment the system also notifies the human user that an interaction has occurred and the UI is ready for the next interactions in 1421, which is useful in certain scenarios, e.g. when these interactions are animal-to-animal communication and no human user is in the vicinity.

It would be preferable that the device used in this invention is lightweight, compact and portable, so that animals can receive training and use the device on the go and at a large number of locations, instead of being restricted to a particular location. This would also be practical for human users living in close quarters who cannot accommodate a large device that takes up valuable space and may require additional room for expansion. It would also be more of language learning for the animal users, as they are more likely to learn the buttons, instead of where the buttons are in the physical space, relying on spatial memory, which would make it more difficult to apply the knowledge in a different setting. Fortunately, not only are many touchscreen devices already lightweight, compact and portable, such as iPhones, Android touchscreen phones, iPads, they are also already ubiquitous. Costly additional hardware would often be unnecessary, using this invention.

Depending on how many speech segments an animal has mastered, and the size and spacing of buttons appropriate for the animal, the size of the display may be too small to fit all regular-sized buttons intended for the animal at once. As a shorthand, we call this the "too many buttons" challenge. This is worth considering, because shrinking the buttons or reducing the space between them may not be practical. This is because animals may not be able to control their extremities with much precision; moreover, they may not be able to control their extremities well enough to perform functions humans take for granted, such as a swipe in a desired direction, a multi-finger pinch. Further, if they already mastered many buttons, spotting the next button they would like to touch in a crowd may be difficult, and getting to that button may still add another level of difficulty.

Figure 15:
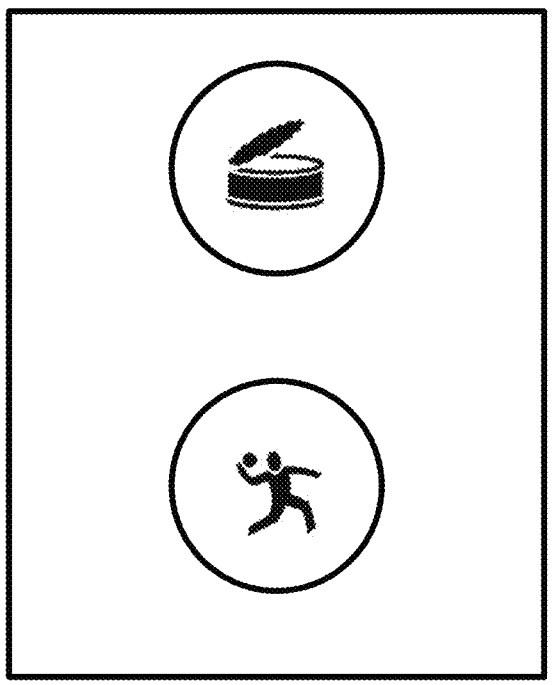
FIG. 15, FIG. 16, FIG. 17, FIG. 18 and FIG. 19 are examples of embodiments that alleviates a possible challenge of the device display being not large enough to display all buttons in their regular sizes.
Figure 15:
Figure 15:
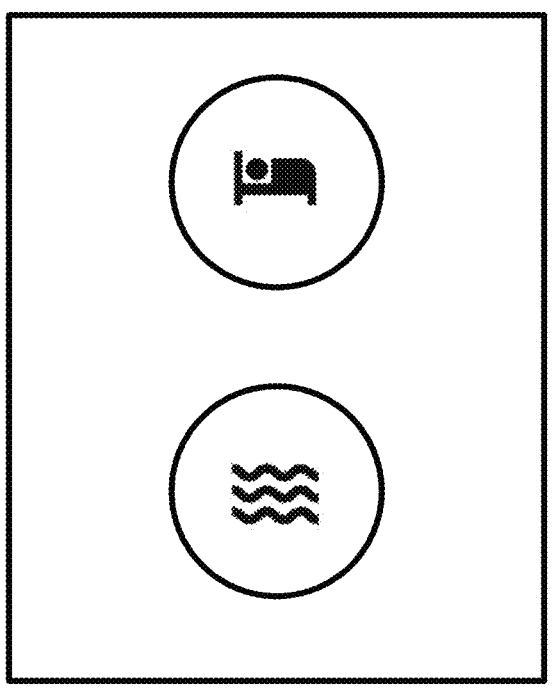

To tackle the "too many buttons" challenge, note that any button cannot go below a certain size or be too close to others, or it would be difficult to see or interact with by an animal. In some embodiments, by deciding which button is likely what the animal wants to touch next based on interpreting a few touches, the system can present that button in its regular size and spacing. Or the system can wait and present all buttons in time on a rotating basis. Some solutions to this challenge can have a recursive nature: consider a system deciding how to display the next set of buttons; once the decision is made and the system displays or highlights certain buttons, the question of how to display the next set of buttons is active again, and the system could apply a similar method to what it just did to solve it again. Hence, some of the embodiments that tackle this challenge also have a recursion in it and can have a recursive definition, and a few examples follow:

In one embodiment, the regular-sized buttons can be presented individually or a few at a time in order, one after another. See FIG. 15 for an example.

Figure 16:
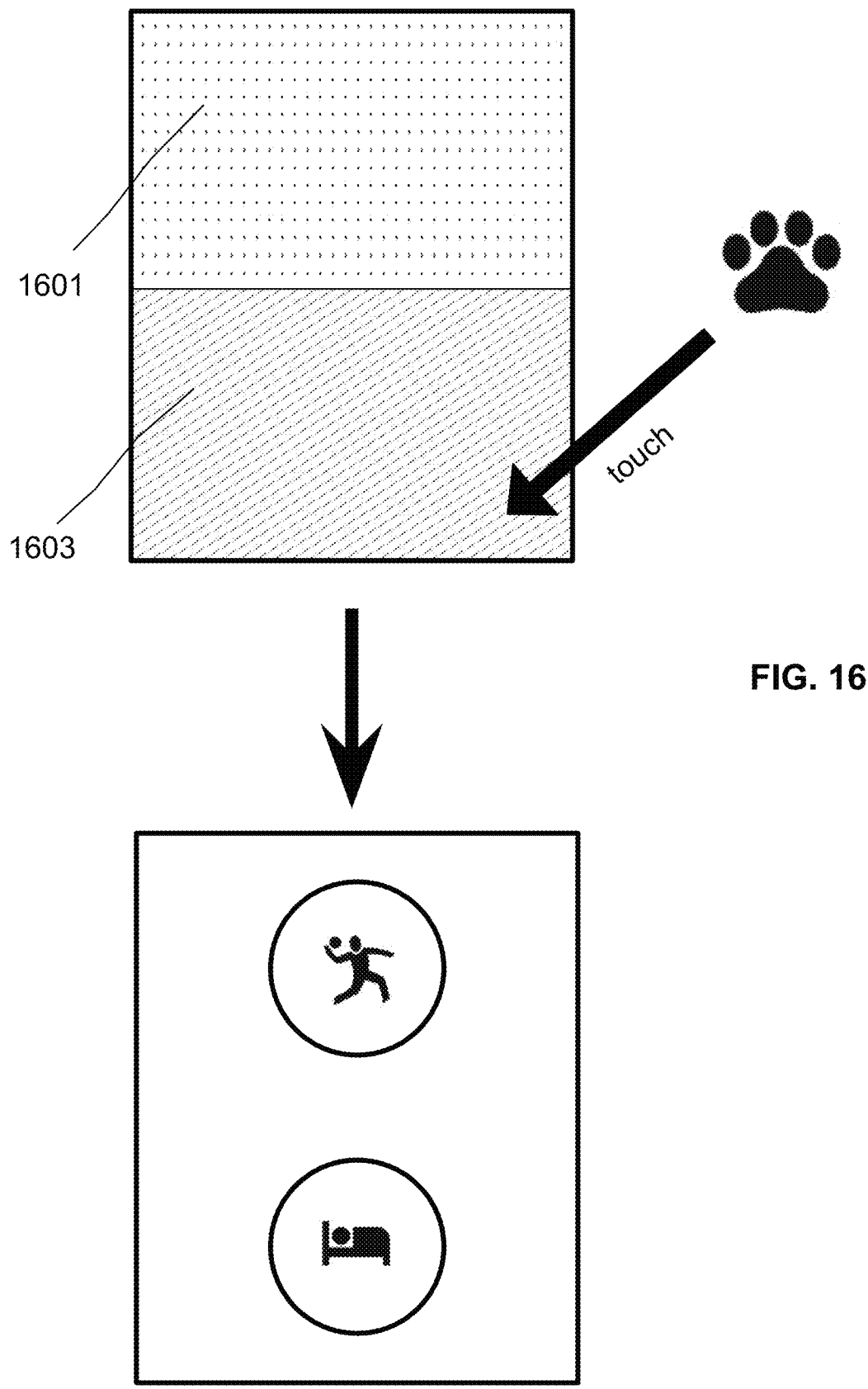

In another embodiment, the buttons could be grouped into groups, possibly with overlaps between groups, and the animal could choose a group first by interacting with a button that represents the group, and then the buttons in the group could be presented. If there are too many groups, or if a group has too many buttons to fit their regular sizes on the screen, then either of these could also be solved by some embodiment that tackles the "too many buttons" challenge, similar to a recursion, and it doesn't have to be this very embodiment. See FIG. 16 for an example, where 1601 is a button that covers the top half of the display, and touching it would bring up buttons that represent various kinds of food; 1603 is a button that covers the bottom half of the display, and touching it would bring up buttons that represent various actions.

Figure 17:
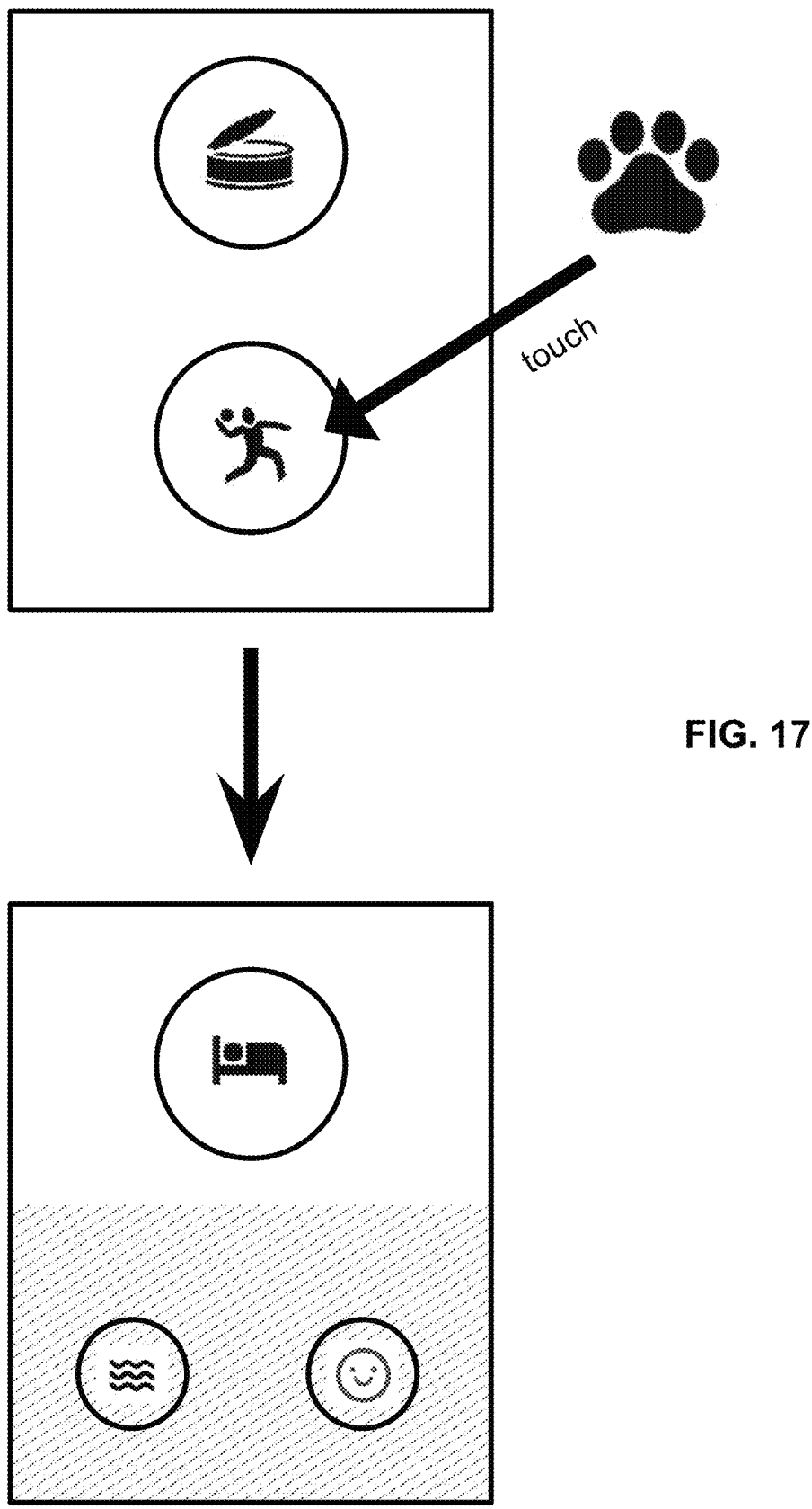

In yet another embodiment, a special set of buttons that represent the buttons predicted as most likely to be touched next, would be displayed in a specific area on the display, or on the entirety of the display. After a touch or waiting a period of time, the system can go on to display the rest of the buttons, which may still be "too many buttons" and be tackled by one of the embodiments in these paragraphs. See FIG. 17 for an example, where, upon touching the lower button on the first screen, the system brings up two most likely buttons on the lower half of the screen.

Figure 18:
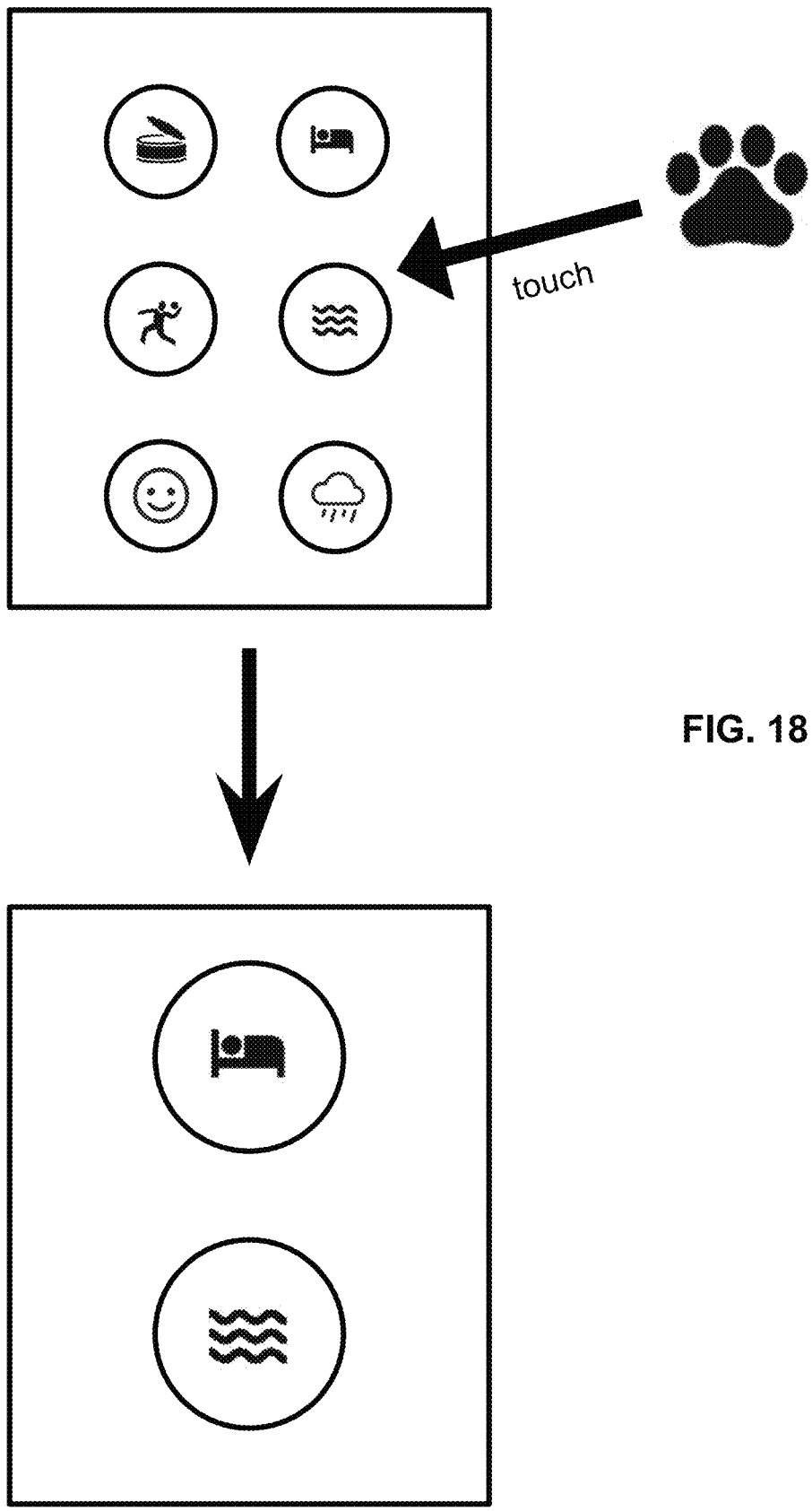

In yet another embodiment, all buttons in minimized sizes are displayed at once; when the animal attempts to touch one button, the display progressively magnifies the buttons in the general area of touch, until they are in their regular sizes, allowing the animal to touch the buttons as usual. See FIG. 18 for an example, where in the first screen the buttons are all smaller than the regular size, and upon touching the screen, buttons around the touch point are magnified in the next screen. If that's not enough magnifying, the next touch in areas close to the buttons would further magnify them.

Figure 19:
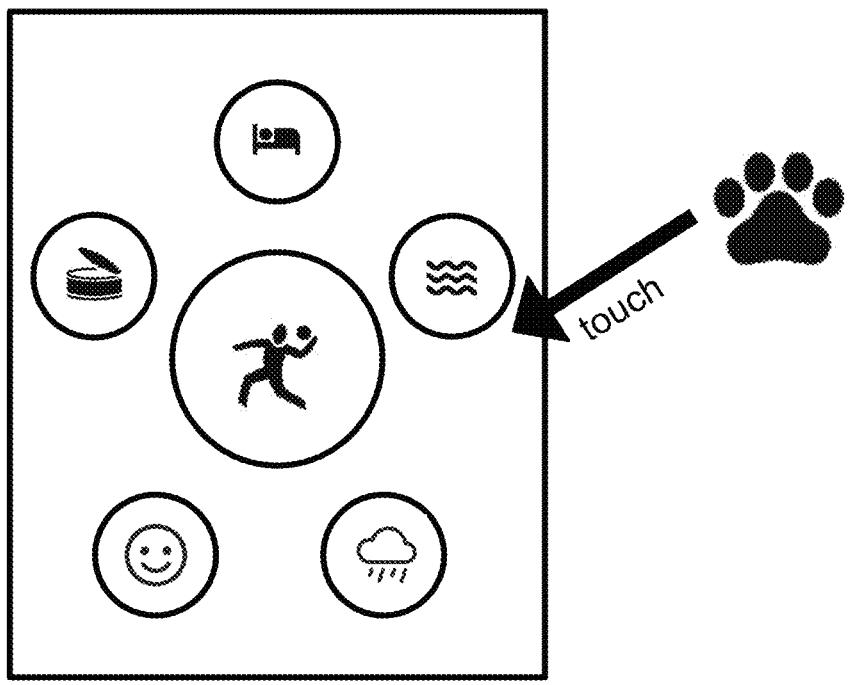
Figure 19:
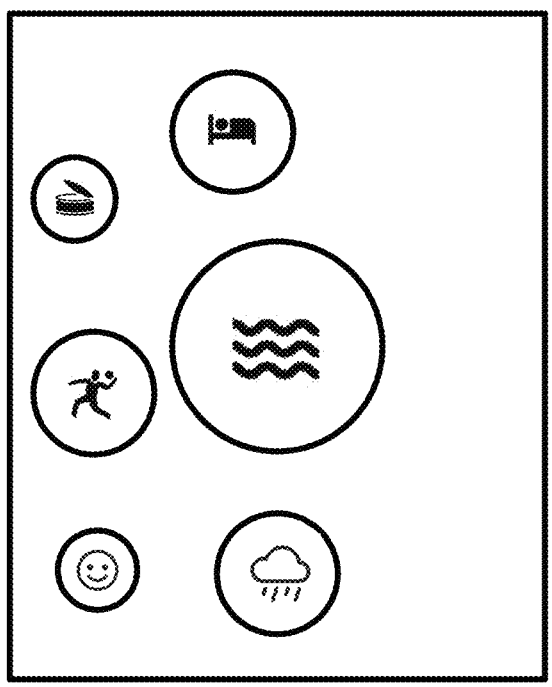

In yet another embodiment, all buttons in minimized sizes are displayed at once; the center of the display magnifies one or a few button to their regular sizes and these regular-sized buttons can be touched as usual; every button could be moved to the center of the screen based on the animal's interaction with the screen. See FIG. 19 for an example, where areas around the touch point moves to the center and expands, squeezing all other buttons to the side.

These embodiments can also be mixed and combined.

Numerous other embodiments are also possible in the spirit and scope of this invention.

All of the aforementioned embodiments offer much convenience, ease and flexibility, and some embodiments offer even more advantages:

Touchscreen devices are already ubiquitous, reasonably lightweight and portable, and usable in many locations. For embodiments that use touchscreen devices as the hardware basis, animals can train and communicate at many locations; and humans often don't need to acquire additional hardware, and don't need to devote a large amount of space for training animals. This should help make the invention adoptable for a large section of the population.

Humans are all speech language experts or animal behavior experts. Some embodiments could give out instructions, tips or suggestions based on data, i.e. being evidence-based, so as to increase the likelihood of success for non-experts, again making the invention more adoptable.

Fast improvements: some embodiments are built to learn and improve constantly, improving all user experiences and language learning efficiency.

Knowledge turnover speed and spillover effect: some embodiments are built to learn and improve constantly based on the experience of the community. And if new training and communication techniques become known, some embodiments are able to push new knowledge to existing devices immediately.

Language learning instead of spatial learning: with these systems, animal learning is more likely to be tied to the buttons themselves than to spatial memory.

The invention claimed is:

1. A language training and communication system for animals, comprising:
an input/output system that includes:
a display capable of switching between a human user interface and an animal user interface via a mechanism on screen which prevents the switching by the animal user;
at least one sensor for sensing locations of user gestures directed at the display;
an auditory output device;
a processor configured to:
display on the screen, in a manner configured to serve a predetermined set of animal users, at least one visual object in the animal user interface and to switch to a human user interface upon activation of the mechanism;
receive sensor input regarding the locations of the user gestures;
determine if at least one location of the locations coincide with a visual object that corresponds with an audio speech segment;
playback the corresponding audio speech segment;
determine if a plurality of locations of the locations coincide with a plurality of visual objects that correspond to an audio speech segment;
playback the corresponding audio speech segment.

2. The system in claim 1, further comprising:
a data storage device, wherein the processor is further configured to:
store data resulting from the sensor input and the user interface in the data storage device; retrieve data from the data storage device to adjust the display and audio speech segments based on past interactions of the animal users and a user settings.

3. The system of claim 1, further comprising a data transmission device and a server that communicates with the system through the data transmission device, wherein the processor is further configured to:
- transmit data to the server that includes the sensor inputs;
- receive data or instructions from the server that controls settings for the display and audio speech segments.

4. The system of claim 1, wherein the processor is further configured to:
- enable human users to customize the animal user interface via the human user interface,
- affecting the visual objects and audio feedback segment by user interactions recorded via the human user interface.

5. A method for facilitating language training and communication for animals using a system, comprising:
- displaying, on a touchable display, a user interface that switches between an animal-focused interface and a human-focused interface based on an interaction of an on-screen switch which prevents the switching by an animal interaction;
- waiting for an animal to interact with visual objects in the animal-focused interface;
- playing back an audio speech segment corresponding to the interacted visual objects;
- storing the interaction data and interface settings allowing customizing of future interactions based on past interactions.

6. The method of claim 5, further comprising: utilizing inter-device communication to synchronize interface settings and interaction data of multiple devices, enabling seamless human user and animal user experience and personalized training sessions based on data collected across the multiple devices.

7. A language training and communication system for animals, comprising:
- at least one animal interaction device comprising:
- a display, configured to be switched between a human input/output device and an animal input/output device using a mechanism which prevents the switching by the animal user, to show visual objects in animal input mode;
- at least one sensor for sensing locations of gestures directed at the display;
- a circuitry to determine if at least one location of the locations coincide with a visual object that corresponds with an audio speech segment;
- playback the corresponding audio speech segment using an auditory output device;
- the human input/output device to control and customize the animal interaction device through a user interface.

8. The system of claim 7, wherein the system further comprising an external input/output device communicating with the animal interaction device directly or via a server over a network.

9. The system of claim 8, wherein the communication between the animal interaction device and the external human input/output device occurs over one of the following networks: a Wi-Fi™, a Bluetooth®, or a cellular network.

10. The system of claim 7, further comprising:
- a processor configured to facilitate communication between the animal interaction device and the human input/output device directly or via a server, manage the display settings, and handle data synchronization between connected or related devices.

11. The system of claim 10, wherein the processor is configured to switch between direct device-to-device communication and server-mediated communication based on network availability or predefined user settings.

12. The system of claim 11, further comprising the server is configured to:
- store settings and preferences customized via the human input/output device;
- synchronize these settings across multiple animal interaction devices;
- provide data analytics based on the interaction data from the animal and human users.

13. A method for facilitating language training and communication for animals comprising:
- displaying customized visual objects on an animal communication device, and sensing locations of gestures directed at the animal communication device, such that an animal interaction with the device triggers corresponding audio output;
- operating a human input device, configured to be switched to animal input device using a mechanism which prevents the switching by an animal, to control and customize interactions of the animal communication device through direct communication or via a server;
- synchronizing the interaction data and the customizations between the human input device and the animal communication device through the direct or server-mediated communication.

14. The method of claim 12, further comprising:
- adjusting the display and audio settings of the animal communication device via the human input device based on real-time interactions or stored interaction histories.

* * * * *